US012588017B2

(12) United States Patent
Lee et al.

(10) Patent No.: US 12,588,017 B2
(45) Date of Patent: Mar. 24, 2026

(54) METHOD AND APPARATUS OF MULTI-LINK COMMUNICATION FOR VEHICLE IN COMMUNICATION SYSTEM BASED ON FRAME INFORMATION INCLUDING MULTIPLE INFORMATION SCHEMES

(71) Applicant: ELECTRONICS AND TELECOMMUNICATIONS RESEARCH INSTITUTE, Daejeon (KR)

(72) Inventors: An Seok Lee, Daejeon (KR); Heesoo Lee, Daejeon (KR); Seung Jae Bahng, Daejeon (KR); Jung Sook Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 496 days.

(21) Appl. No.: 17/681,212

(22) Filed: Feb. 25, 2022

(65) Prior Publication Data

US 2022/0272716 A1 Aug. 25, 2022

(30) Foreign Application Priority Data

Feb. 25, 2021 (KR) ........................ 10-2021-0025811
Feb. 25, 2022 (KR) ........................ 10-2022-0024988

(51) Int. Cl.
| | |
|---|---|
| *H04B 7/06* | (2006.01) |
| *H04B 1/56* | (2006.01) |
| *H04B 7/155* | (2006.01) |
| *H04W 4/40* | (2018.01) |
| *H04W 4/44* | (2018.01) |
| *H04W 4/46* | (2018.01) |

(Continued)

(52) U.S. Cl.
CPC .......... *H04W 72/1215* (2013.01); *H04B 1/56* (2013.01); *H04B 7/0613* (2013.01);

(Continued)

(58) Field of Classification Search
CPC ... H04W 72/1215; H04W 4/40; H04W 16/28; H04W 24/02; H04W 76/15; H04W 74/04;

(Continued)

(56) References Cited

U.S. PATENT DOCUMENTS 7,110,678 B2 9/2006 Willebrand et al.
7,333,458 B2 * 2/2008 Cain ................... H04W 72/542
370/339

(Continued)

FOREIGN PATENT DOCUMENTS

KR 10-2017-0073445 A 6/2017
KR 10-2019-0121602 A 10/2019

OTHER PUBLICATIONS

Mostafa Zaman Chowdhury et al., "Optical Wireless Hybrid Networks: Trends, Opportunities, Challenges, and Research Directions", IEEE Communications Surveys & Tutorials, vol. 22, No. 2, Second Quarter, pp. 930-966, Jan. 15, 2020.

*Primary Examiner* — Salvador E Rivas
(74) *Attorney, Agent, or Firm* — Rabin & Berdo, P.C.

(57) ABSTRACT

An operation method performed by an access point in a communication system may comprise: transmitting, to a first station, a first frame by using a third communication scheme, the first frame including information on an address of the first station, a first transmission time length, a first reception order, and a first communication scheme to be used for transmitting data to the first station, and information on a second transmission time length, a second reception order, and a second communication scheme to be used for transmitting second data to one or more second stations; receiving, from the first station, a first response frame for the first frame from the first station at a first reception time; and receiving, from the second station, a second response frame for the first frame at a second reception time.

10 Claims, 32 Drawing Sheets

(51) Int. Cl.

| | |
|---|---|
| *H04W 16/28* | (2009.01) |
| *H04W 24/02* | (2009.01) |
| *H04W 72/12* | (2023.01) |
| *H04W 76/15* | (2018.01) |
| *H04B 10/2575* | (2013.01) |
| *H04L 9/40* | (2022.01) |
| *H04L 47/62* | (2022.01) |

(52) U.S. Cl.
CPC ............ *H04B 7/1555* (2013.01); *H04W 4/40* (2018.02); *H04W 4/44* (2018.02); *H04W 4/46* (2018.02); *H04W 16/28* (2013.01); *H04W 24/02* (2013.01); *H04W 76/15* (2018.02); *H04B 10/2575* (2013.01); *H04L 47/62* (2013.01); *H04L 63/18* (2013.01)

(58) Field of Classification Search
CPC ........ H04W 4/44; H04W 4/46; H04B 7/0617; H04B 7/1555; H04B 7/18565; H04B 1/56; H04B 7/0613; H04B 10/2575; H04L 47/62; H04L 63/18; H04L 12/2424; H04L 12/5895
See application file for complete search history.

(56) References Cited

U.S. PATENT DOCUMENTS

| | | | | |
|---|---|---|---|---|
| 9,113,479 | B2 * | 8/2015 | Seok ....................... | H04W 4/06 |
| 10,542,491 | B2 | 1/2020 | Bhattad et al. | |
| 2008/0026797 | A1 * | 1/2008 | Nanda ..................... | H01Q 3/24 |
| | | | | 455/562.1 |
| 2010/0054213 | A1 * | 3/2010 | Trainin ................. | H04W 28/26 |
| | | | | 370/336 |
| 2011/0199953 | A1 * | 8/2011 | Seok ....................... | H04W 4/06 |
| | | | | 370/312 |
| 2013/0230028 | A1 * | 9/2013 | Calcev ................. | H04L 1/0002 |
| | | | | 370/336 |
| 2015/0316927 | A1 | 11/2015 | Kim et al. | |
| 2017/0111806 | A1 * | 4/2017 | Roh ..................... | H04W 16/28 |
| 2019/0253169 | A1 | 8/2019 | Ha et al. | |
| 2020/0186247 | A1 | 6/2020 | Kang et al. | |
| 2021/0076202 | A1 | 3/2021 | Park et al. | |
| 2021/0084659 | A1 | 3/2021 | Leizerovich et al. | |
| 2021/0344422 | A1 * | 11/2021 | Shiina .................. | H04W 72/54 |
| 2022/0361070 | A1 * | 11/2022 | Shiina .................. | H04W 36/08 |
| 2023/0127036 | A1 * | 4/2023 | He ..................... | H04W 74/002 |
| | | | | 370/329 |

* cited by examiner

Interference

FIG. 16

FIG. 22 challenge C ⟶ PUF device ⟶ response R

2910

METHOD AND APPARATUS OF MULTI-LINK COMMUNICATION FOR VEHICLE IN COMMUNICATION SYSTEM BASED ON FRAME INFORMATION INCLUDING MULTIPLE INFORMATION SCHEMES

CROSS-REFERENCE TO RELATED APPLICATIONS

This application claims priority to Korean Patent Applications No. 10-2021-0025811 filed on Feb. 25, 2021 and No. 10-2022-0024988 filed on Feb. 25, 2022 with the Korean Intellectual Property Office (KIPO), the entire contents of which are hereby incorporated by reference.

BACKGROUND

1. Technical Field

The present disclosure relates to a multi-link communication technique for vehicles in a communication system, and more particularly, to a multi-link communication technique for aerial vehicles in a communication system in which communications are performed using directional communication links and omni-directional communication links.

2. Related Art

A communication system using microwaves in a wireless communication technology may provide communication services in a range of several kilometers at a transmission rate of several tens of Mbps. In contrast, a free space optical (FSO) based communication system may provide communication services from a short distance to a range of 5 km, and may guarantee a transmission speed of up to 10 Gbps. An optical wireless communication (OWC) technology may be such the FSO based communication technology.

Meanwhile, a drone communication system may be largely composed of at least one drone which is a mission performer, a ground control system, and a wireless communication system. Here, the wireless communication system may be important because it may connect the drone and the ground control system to enable the drone to perform a given mission, control the drone, and transmit and receive control commands to and from the drone. Such the drone communication system may increase transmission efficiency by using a multi-link communication scheme that simultaneously uses radio frequency (RF) communication and optical wireless communication in consideration of a channel interference, a channel condition, obstacles, and the like. Such the drone communication system may require a transmission method that minimizes interferences in an inter-link interference situation or avoids a blocking situation.

SUMMARY

In order to solve the above-identified problems, exemplary embodiments of the present disclosure are directed to providing a method and an apparatus for multi-link communications for vehicles in a communication system, which enable reliable communications by minimizing link interferences and blocking effects in a multi-link communication scheme configured with directional communication links and omni-directional communication links. Although this application has been mainly described for vehicles, it is also applicable to mobile devices if not limited thereto.

According to a first exemplary embodiment of the present disclosure for achieving the above-described objective, an operation method performed by an access point in a communication system may comprise: transmitting, to a first station, a first frame by using a third communication scheme, the first frame including information on an address of the first station, a first transmission time length, a first reception order, and a first communication scheme to be used for transmitting data to the first station, and information on a second transmission time length, a second reception order, and a second communication scheme to be used for transmitting second data to one or more second stations; receiving, from the first station, a first response frame for the first frame from the first station at a first reception time; and receiving, from the second station, a second response frame for the first frame at a second reception time.

The third communication scheme may be a directional communication scheme or an omni-directional communication scheme, and a communication scheme for receiving the first response frame and the second response frame may be determined based on transmittable interfaces of the first station and the second station.

The second reception time may be determined based on the third communication scheme used for transmitting the first frame, and information on a transmittable communication interface of the second station.

The operation method may further comprise, when the first communication scheme, the second communication scheme, and the third communication scheme are directional communication schemes, determining whether simultaneous transmissions to the first station and the second station are possible based on whether the first response frame and the second response frame are received.

The first communication scheme and the second communication scheme may be different from each other.

The first communication scheme and the second communication scheme may be equal to each other, and may be a pair of stations capable of performing simultaneous transmissions without interfering with each other for data transmission.

The operation method may further comprise, when the first communication scheme and the second communication scheme are equal to each other, transmitting the first data to the first station; receiving a third response frame for the first data from the first station; transmitting the second data to the second station; receiving a fourth response frame for the second data from the second station; and determining whether simultaneous transmissions to the first station and the second station are possible by identifying whether the first data and the second data have been normally transmitted based on the third response frame and the fourth response frame.

Information on communicable interfaces of the first station and the second station may be received from the first station and the second station before a simultaneous transmission time, and the first communication scheme and the second communication scheme may be determined based thereon.

When the first communication scheme and the second communication scheme are equal to each other and simultaneous transmissions to the first station and the second station are impossible, a transmission time of the second data may be configured to be immediately after an end of transmission of the first data.

According to a second exemplary embodiment of the present disclosure for achieving the above-described objective, an operation method performed by a station in a communication system may comprise: receiving, from an access point, a first frame by using a first communication scheme; identifying whether the station is included in destination terminal(s) of the first frame; when the station is included in the destination terminal(s), identifying a first transmission time length, a first communication scheme, and a first reception order for receiving data; and transmitting a response frame for the first frame by using a third communication scheme at a first transmission time.

When the first communication scheme is a directional communication scheme and the station is capable of performing transmission using the directional communication scheme, the third communication scheme may be determined as the directional communication scheme, and in other cases, the third communication scheme may be determined as an omni-directional communication scheme.

When the third communication scheme is a directional communication scheme, a first responsive time regardless of the first reception order may be determined as the first transmission time, or when the third communication scheme is an omni-directional communication scheme, the first transmission time may be sequentially determined from the first responsive time according to the first reception order.

According to a third exemplary embodiment of the present disclosure for achieving the above-described objective, an operation method of an access point in a communication system may comprise: receiving, from a first station, global positioning system (GPS) information; transmitting, toward the first station, M×N background beams, and i×j overlap beams overlapping the background beams according to the received GPS information; receiving, from the first station, a response signal for a first background beam; configuring an object tracking range by using background beams and overlap beams adjacent with the first background beam; and tracking a position of the first station by moving the object tracking range in a movement direction of the first station, wherein M, N, i, and j are natural numbers.

The operation method may further comprise: expanding beam widths of the overlap beams constituting the object tracking range; reconfiguring the object tracking range by using the overlap beams with the expanded beam widths; and tracking the position of the first station by moving the reconfigured object tracking range in a movement direction of the first station.

The operation method may further comprise: detecting a second station adjacent to the first station; moving the second station to a position of the overlap beams; and changing a first communication scheme used for communication with the first station and a second communication scheme used for communication with the second station to be different from each other.

According to the present disclosure, an access point (AP) can communicate with vehicles using a multi-link, thereby improving a data transmission speed. In addition, according to the present disclosure, since the AP can communicate with vehicles by using a multi-link, improvement in latency can be expected. In addition, according to the present disclosure, when the AP uses the same communication scheme as the adjacent vehicles, data can be transmitted and received at different times, so that communications can be performed without interference. In addition, according to the present disclosure, when the AP communicates with adjacent vehicles, it is possible to communicate without interference by respectively using different communication scheme with the vehicles. In addition, according to the present disclosure, the AP can assign a group identifier (ID) to vehicles to perform transition between a wake-up mode and a power-saving mode for each group. In addition, according to the present disclosure, a vehicle is provided with a physical unclonable function (PUF), and the AP authenticates the vehicle by using the PUF, so that authentication of the vehicle can be safely performed.

BRIEF DESCRIPTION OF DRAWINGS

FIG. 5 is a conceptual diagram illustrating a first exemplary embodiment of a transmission method through a multi-link when there is inter-link interference.

FIG. 16 is a conceptual diagram illustrating a first exemplary embodiment of a data transmission method when a link interference exists.

FIG. 22 is a conceptual diagram illustrating a third exemplary embodiment of a data transmission method in a two-link environment without interference.

DETAILED DESCRIPTION OF THE EMBODIMENTS

Figure 1:
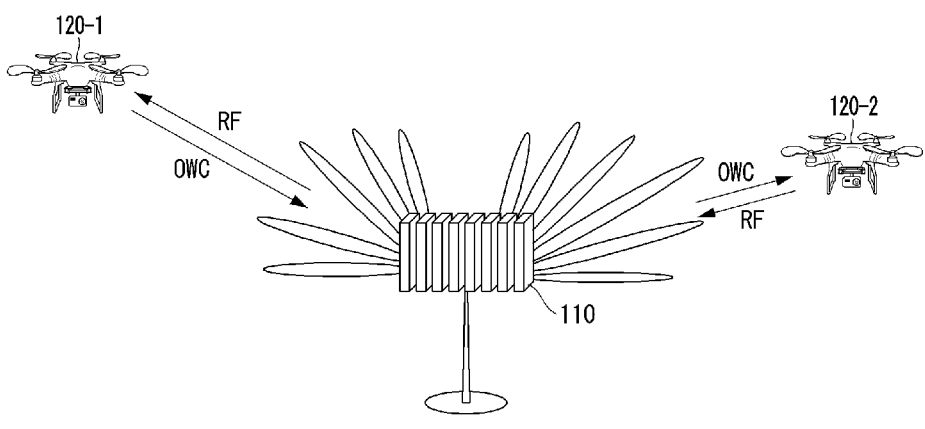
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

Meanwhile, a communication system using microwaves in a wireless communication technology may provide communication services in a range of several kilometers at a transmission rate of several tens of Mbps. In contrast, a communication system using free space optical (FSO) may provide communication services from a short distance to a range of 5 km, and may guarantee a transmission speed of up to 10 Gbps. The optical wireless communication (OWC) technology including such the FSO could not provide commercial services for a long time due to a channel turbulence, blocking, and difficulties in tracking vehicles in an environment requiring mobility. However, in the 1970s, the OWC began to be used for military security communication, and in the 1980s, the OWC was also applied to indoor communication systems. In addition, in the 1990s, in relation to the OWC, an infrared data association (IrDA) group standardized infrared data communication. In 2008, a visible light communication (VLC) standardization group was created in relation to the OWC, and VLC standards were established in the institute of electrical and electronics engineers (IEEE) in 2009, and the standardization therefor is in progress until recently to be used for Internet of things (IoT), device-to-device (D2D) communications, connected cars, and the like.

Meanwhile, a drone communication system may be largely composed of a drone which is a mission performer, a ground control system, and a wireless communication system. Here, the wireless communication system may be important because it may connect the drone and the ground control system to enable the drone to perform a given mission, control the drone, and transmit and receive control commands to and from the drone.

FIG. 1 is a conceptual diagram illustrating a first exemplary embodiment of a communication system.

Referring to FIG. 1, a communication system may include an access point (AP) 110 of a ground control system and a plurality of drones 120-1 and 120-2. Here, the ground control system may control the plurality of drones 120-1 and 120-2 based on a wireless communication scheme(s) through the AP 110, and may deliver information on missions. The plurality of drones 120-1 and 120-2 may transmit collected data and mission results to the ground control system through the AP 110 based on a wireless communication scheme(s). In this manner, the plurality of drones 120-1 and 120-2 may transmit information on speeds, positions, and movement paths, and collected data to the ground control system based on the wireless communication scheme(s). Here, configuration of the AP 110 and the plurality of drones 120-1 and 120-2 may be the same as the following communication node.

Figure 2:
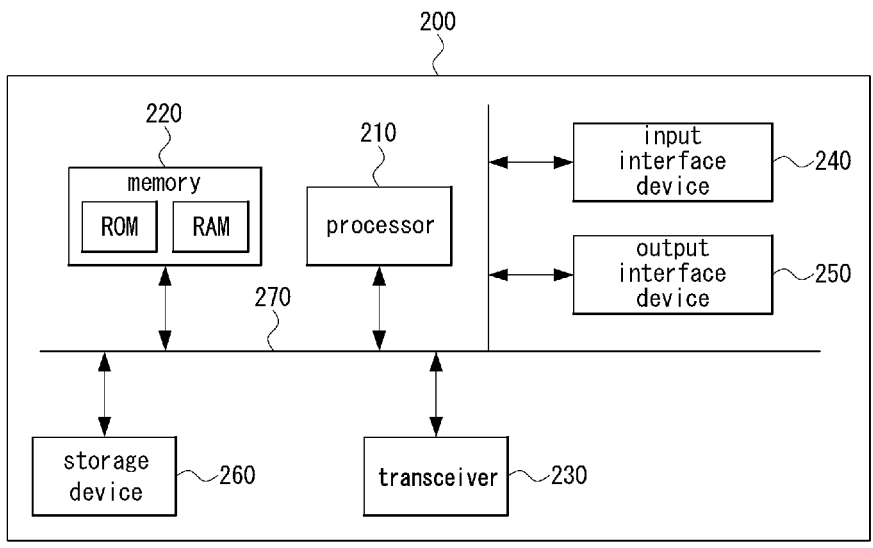
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM). Here, the communication node 200 may be the drone, the flight permission approval server, the nuclear power plant server, the obstacle device, the drone taxi, the landing site server, the drone company server, or the card company server.

Referring again to FIG. 1, each of the AP 110 and the plurality of drones 120-1 and 120-2 may transmit messages in an omni-directional manner by using a radio frequency (RF) communication technology. In addition, each of the AP 110 and the plurality of drones 120-1 and 120-2 may receive messages in the omni-directional manner by using the RF communication technology. On the other hand, each of the AP 110 and the plurality of drones 120-1 and 120-2 may transmit directional messages only in a specific direction by using an optical wireless communication (OWC) technology. In addition, each of the AP 110 and the plurality of drones 120-1 and 120-2 may receive messages only in a specific direction by using the OWC technology. As described above, when the AP 110 and the plurality of drones 120-1 and 120-2 use the RF communication scheme, it may be advantageous in terms of operational convenience. However, when the AP 110 and the plurality of drones 120-1 and 120-2 use the RF communication scheme (i.e., RF scheme), interference may be given to the surroundings. In addition, when the AP 110 and the plurality of drones 120-1 and 120-2 use the RF scheme, it may be inefficient in power use, and thus performance may be limited. On the other hand, when the AP 110 and the plurality of drones 120-1 and 120-2 use the OWC scheme, it may not be necessary to obtain a permission to use frequency resources. In addition, when the AP 110 and the plurality of drones 120-1 and 120-2 use the OWC scheme, it may be easy to maintain security due to the straightness and low transmittance of radio waves. In addition, when the AP 110 and the plurality of drones 120-1 and 120-2 use the OWC scheme, the equipment prices may be cheaper than the RF communication equipments. In addition, when the AP 110 and the plurality of drones 120-1 and 120-2 use the OWC scheme, harmfulness to a human body may be low. In addition, when the AP 110 and the plurality of drones 120-1 and 120-2 use the OWC scheme, power consumption efficiency may be good.

Accordingly, the drone communication system may increase transmission efficiency by using a multi-link communication scheme that simultaneously uses the RF scheme and the OWC scheme in consideration of channel interferences, channel conditions, obstacles, and the like. In this case, the drone communication system may use a multiplexed and/or duplicated transmission scheme in consideration of movement conditions and channel turbulences of the plurality of drones. In addition, the drone communication system may use a transmission scheme for reducing a beam tracking error. In addition, the drone communication system may use a transmission scheme that minimizes interference in a multi-link interference situation or avoids a blocking situation.

Figure 3:
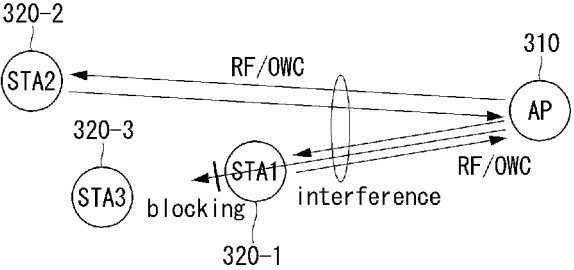
FIG. 3 is a conceptual diagram illustrating a first exemplary embodiment of a communication system using a multi-link.

FIG. 3 is a conceptual diagram illustrating a first exemplary embodiment of a communication system using a multi-link.

Referring to FIG. 3, a communication system using a multi-link may include an AP 310 of a ground control system and a plurality of stations (STAs) 320-1, 320-2, and 320-3. The STAs may be mounted on drones, respectively. Here, the AP 310 and the plurality of STAs 320-1, 320-2, and 320-3 may communicate based on the RF scheme or the OWC scheme. Here, the RF communication may be an omni-directional scheme. On the other hand, the OWC may be a directional communication scheme. In such the drone communication system, communications between the AP 310 and the STA 320-1 may interfere with the AP 310 and the STA 320-2. In addition, in the same communication system, communications between the AP 310 and the STA 320-2 may interfere with the AP 310 and the STA 320-1. Meanwhile, the STA1 320-1 may be located between the AP 310 and STA 320-3. In this case, the STA 320-1 may block communications between the AP 310 and STA 320-3. As described above, when the communication system uses a multi-link transmission scheme, interference and blocking between links may occur. Accordingly, the present disclosure proposes a technology capable of minimizing link interference and blocking effects in the multi-link communication scheme composed of directional communication links and omni-directional communication links, and safely performing low-power communication.

In the present disclosure, the AP and the STA may each have an RF communication interface (i.e., RF interface) and an OWC interface. In addition, the AP and the STA may communicate using one of the two interfaces (i.e., RF interface and OWC interface). In addition, the AP and the STA may communicate using both interfaces (i.e., RF interface and OWC interface). Similarly, two STAs may each have an RF interface and an OWC interface. In addition, the two STAs may communicate using one of the two interfaces (i.e., RF interface and OWC interface). In addition, the two STAs may communicate using both interfaces (i.e., RF interface and OWC interface). Meanwhile, the AP and one or more STAs may communicate through a multi-link having one or more communication links. In addition, the STAs may communicate with each other using a multi-link having one or more communication links. When the AP and the STAs perform communications using a multi-link, simultaneous transmissions using the multi-link may be possible if there is no inter-link interference or blocking.

Figure 4:
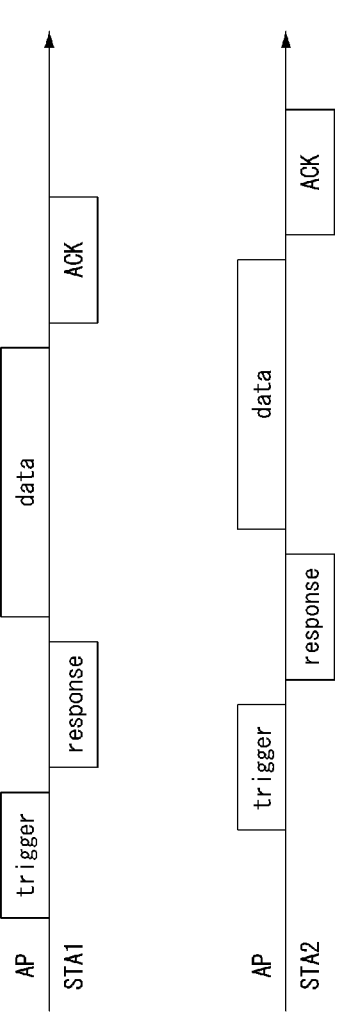
FIG. 4 is a conceptual diagram illustrating a first exemplary embodiment of a method for simultaneous transmissions through a multi-link when there is no inter-link interference.

FIG. 4 is a conceptual diagram illustrating a first exemplary embodiment of a method for simultaneous transmissions through a multi-link when there is no inter-link interference.

Referring to FIG. 4, an AP may transmit a first trigger signal to a STA1. Here, the STA1 may be located in a drone 1. Accordingly, the STA1 may receive the first trigger signal from the AP. In addition, the STA1 may transmit a first response signal for the first trigger signal to the AP, and the AP may receive the first response signal for the first trigger signal from the STA1. Accordingly, the AP may transmit a first data signal to the STA1, and the STA1 may receive the first data signal from the AP. In addition, the STA1 may transmit a first acknowledgment (ACK) signal to the AP, and the AP may receive the first ACK signal from the STA1.

Meanwhile, the AP may transmit a second trigger signal to the STA2. Here, the STA2 may be located in a drone 2. Accordingly, the STA2 may receive the second trigger signal from the AP. In this case, a transmission time of the second trigger signal transmitted by the AP to the STA2 may overlap with a transmission time of the first trigger signal transmitted by the AP to the STA1. In addition, the STA2 may transmit a second response signal for the second trigger signal to the AP, and the AP may receive the second response signal for the second trigger signal from the STA2. In this case, a transmission time of the second response signal transmitted by the STA2 to the AP may overlap with a transmission time of the first response signal transmitted by the STA1 to the AP. Meanwhile, the AP may transmit a second data signal to the STA2, and the STA2 may receive the second data signal from the AP. In this case, a transmission time of the second data signal transmitted by the AP to the STA2 may overlap with a transmission time of the first data signal transmitted by the AP to the STA1. In addition, the STA2 may transmit a second ACK signal to the AP, and the AP may receive the second ACK signal from the STA2. In this case, a transmission time of the second ACK signal transmitted by STA2 to the AP may overlap with a transmission time of the first ACK signal transmitted by STA1 to the AP.

The transmission time of the first trigger signal and the transmission time of the second trigger signal may overlap each other in time. Also, the transmission time of the first response signal and the transmission time of the second response signal may overlap each other in time. Also, the transmission time of the first data signal and the transmission time of the second data signal may overlap each other in time. Also, the transmission time of the first ACK signal and the transmission time of the second ACK signal may overlap each other in time.

Figure 5:
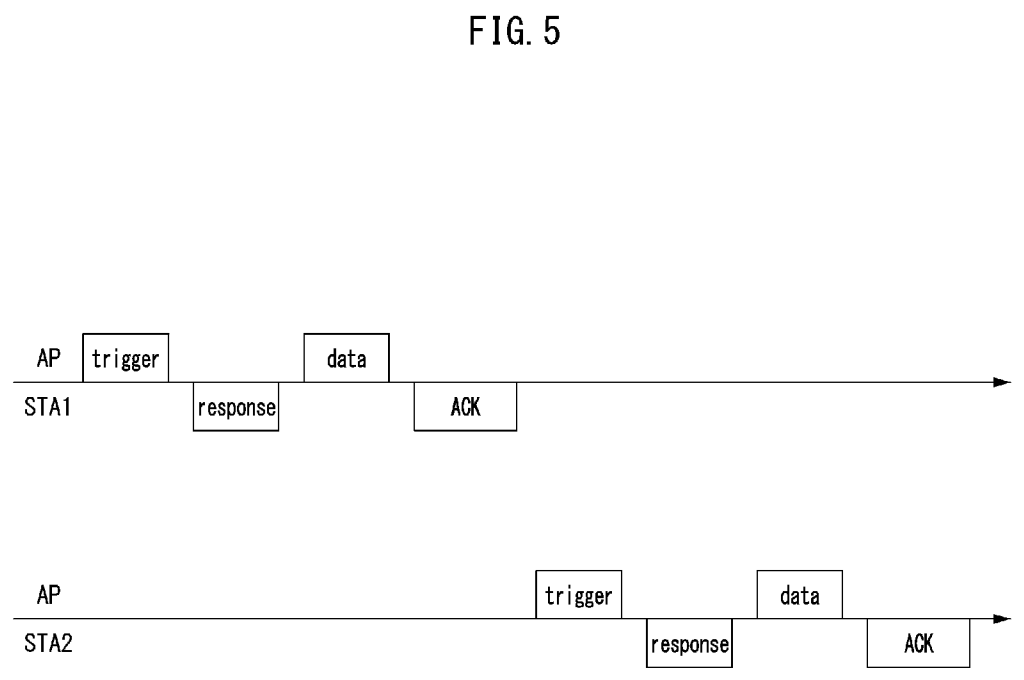

As described above, when a communication link between the AP and the STA1 and a communication link between the AP and the STA2 do not have inter-link interference or blocking, simultaneous transmissions using the multi-link may be possible as shown in FIG. 5. As described above, when the AP transmits/receives data to/from the STA1 and the STA2 by using a multi-link, a data transmission speed (i.e., throughput) and delay time (i.e., latency) can be improved. A device supporting multi-link (e.g., AP, STA1 or STA2) may have multiple physical radio interfaces, but may have a single media access control (MAC) address and a single Internet protocol (IP) address. In addition, the device supporting multi-link may be designed to have a single interface (e.g., MAC service access point (SAP)) in a logical link control (LLC) layer. In the device supporting multi-link, each link may operate as being connected to an upper layer through the MAC SAP. The device(s) supporting multi-link independently or jointly perform packet fragmentation, packet aggregation, dynamic link switching, and retransmission by using the multi-link.

An example of a multi-link without such interference may be a case in which each link has a different interface. As an example, the AP and the STA1 may use the RF scheme, and the AP and the STA2 may use the OWC scheme. Alternatively, the AP and the STA1 may use the OWC scheme, and the AP and the STA2 may use the RF scheme. Another example may be a case in which two drones are located apart from each other when both links use the OWC scheme. That is, the AP and the STA1 may use the OWC scheme, and the AP and the STA2 may use the OWC scheme, but they may be separated from each other. In this case, two different links using different beams may not be able to give or receive influence to and from each other.

Meanwhile, the STA1 and the STA2 may be in similar positions or may be in the same position. In this case, interference may occur between the two links formed by the AP and the two STAs (i.e., STA1 and STA2). In addition, blocking of a signal may occur between the two links formed by the AP and the two STAs (i.e., STA1 and STA2). When interference and blocking occur between the two links formed by the AP and the two STAs (i.e., STA1 and STA2), transmission/reception quality may deteriorate. Thus, the AP may detect the interference or blocking by measuring a signal quality. Also, when interference or blocking occurs between the two links formed by the AP and the two STAs (i.e., STA1 and STA2), an error rate may increase. Accordingly, the AP may detect the interference or blocking by counting whether a response signal has arrived. Alternatively, the AP may measure a correlation of a preamble, and when no correlation is detected and a reception signal is detected, the AP may measure a power level of an interference signal. On the other hand, a transmitting end (i.e., AP) or a receiving end (i.e., STA1 or STA2) may determine a blocking condition when a reception strength of a communication signal is suddenly lowered. In such the case, the transmitting end may use a scheme of transmitting a signal by scheduling a transmission time to avoid the interference situation or blocking situation. However, when the transmitting end transmits a signal by scheduling a transmission time in this manner, link and channel usage efficiency may be reduced.

FIG. 5 is a conceptual diagram illustrating a first exemplary embodiment of a transmission method through a multi-link when there is inter-link interference.

Referring to FIG. 5, the AP may transmit a first trigger signal to the STA1. Accordingly, the STA1 may receive the first trigger signal from the AP. In addition, the STA1 may transmit a first response signal for the first trigger signal to the AP, and the AP may receive the first response signal for the first trigger signal from the STA1. Accordingly, the AP may transmit a first data signal to the STA1, and the STA1 may receive the first data signal from the AP. In addition, the STA1 may transmit a first ACK signal to the AP, and the AP may receive the first ACK signal from the STA1.

Meanwhile, the AP may transmit the second trigger signal to the STA2 after a transmission time of signals with the STA1 ends. Accordingly, the STA2 may receive the second trigger signal from the AP. In addition, the STA2 may transmit a second response signal for the second trigger signal to the AP, and the AP may receive the second response signal for the second trigger signal from the STA2. Accordingly, the AP may transmit the second data signal to the STA2, and the STA2 may receive the second data signal from the AP. In addition, the STA2 may transmit a second ACK signal to the AP, and the AP may receive the second ACK signal from the STA2.

In this case, transmission times of the first trigger signal, the first response signal, the first data signal, and the first ACK signal and transmission times of the second trigger signal, the second response signal, the second data signal, and the second ACK signal do not overlap each other.

Figure 6:
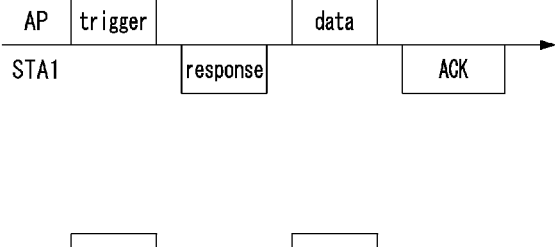
FIG. 6 is a conceptual diagram illustrating a first exemplary embodiment of a method for transmitting a trigger frame and a response signal through a multi-link.

FIG. 6 is a conceptual diagram illustrating a first exemplary embodiment of a method for transmitting a trigger frame and a response signal through a multi-link.

Referring to FIG. 6, the AP may transmit a first trigger frame to the STA 1. In addition, the AP may transmit a second trigger frame to the STA2. In this case, a transmission time of the first trigger frame and a transmission time of the second trigger frame may be the same. In this case, the first trigger frame and the second trigger frame may include information on transmission links related to multi-link transmission, transmission times, and the like.

Meanwhile, the STA1 may receive the first trigger frame, and the STA1 may measure a reception quality of the first trigger frame. Accordingly, the STA1 may transmit a first response frame including the reception quality of the first trigger frame to the AP. In this case, the STA1 may not receive the first trigger frame, and in this case, may not transmit the first response frame to the AP. Similarly, the STA2 may receive the second trigger frame, and the STA2 may measure a reception quality of the second trigger frame. Accordingly, the STA2 may transmit a second response frame including the reception quality of the second trigger frame to the AP. In this case, the STA2 may not receive the second trigger frame, and in this case, may not transmit the second response frame to the AP.

On the other hand, the AP may receive the first response frame from the STA1, and may identify the reception quality of the first trigger frame from the first response frame. The AP may determine that interference or blocking has not occurred when the reception quality of the first trigger frame is good. Accordingly, the AP may transmit a first data signal to the STA1, and the STA1 may receive the first data signal from the AP. In addition, the STA1 may transmit a first ACK signal to the AP, and the AP may receive the first ACK signal from the STA1. Alternatively, the AP may determine that interference or blocking has occurred when the reception quality of the first trigger frame is not good. In this case, the AP may not transmit the first data signal to the STA1. The AP may not receive the first response frame from the STA1. In this case, the AP may determine that interference or blocking has occurred. In this case, the AP may not transmit the first data signal to the STA1.

Similarly, the AP may receive the second response frame from the STA2, and identify the reception quality of the second trigger frame from the second response frame. The AP may determine that interference or blocking has not occurred when the reception quality of the second trigger frame is good. Accordingly, the AP may transmit the second data signal to the STA2, and the STA2 may receive the second data signal from the AP. In addition, the STA2 may transmit a second ACK signal to the AP, and the AP may receive the second ACK signal from the STA2. Alternatively, the AP may determine that interference or blocking has occurred when the reception quality of the second trigger frame is poor. In this case, the AP may not transmit the second data signal to the STA2. The AP may not receive the second response frame from the STA2. In this case, the AP may determine that interference or blocking has occurred. In this case, the AP may not transmit the second data signal to the STA2.

As described above, the AP may determine an interference or blocking situation based on the trigger frame and the response therefor. To this end, the AP may transmit the trigger frames through multiple links in which simultaneous transmissions are to be performed. In this case, the AP may not include different links having a clear interference relationship as links for the simultaneous transmissions. In such the situation, the trigger frame may include information on transmission links related to the multi-link transmission and information on transmission times thereof. Upon receiving the trigger frame, the STA may transmit a response frame including the reception quality of the trigger frame of the link to the AP. If the STA does not normally receive the trigger frame due to severe inter-link interference or blocking, the STA may not transmit the response frame to the AP.

Meanwhile, the AP may receive the response frames from the STAs. The AP may extract reception quality for each link based on the received response signals, and may identify information on link(s) in which normal reception cannot be performed due to severe interference or blocking. The AP may perform transmissions through one or multiple links based on the extracted information. For example, the AP may perform transmissions using a plurality of links when there is little or no interference between different links. In contrast, the AP may transmit data using a single link when inter-link interference is very severe or blocking exists. The AP may update the inter-link interference relationship according to the interference relationship between different links identified through the trigger frames or the transmission results of the data frames.

Meanwhile, the AP and aerial vehicles (e.g., drones) may use an RF/OWC hybrid type transmitter. In this case, the RF/OWC hybrid type transmitter may have a multiple-input and multiple-output (MIMO) structure. In addition, the RF/OWC hybrid type transmitter may have a plurality of elements. Here, the element may be an RF antenna or a light source. In such the AP, OWC MIMO may be used for transmitting beams so that multiple beams do not overlap each other in order to minimize interference between the respective light sources (e.g., light emitting diodes (LEDs)), and thus good reception quality can be achieved even when the beams are not aligned to the accurate position of the aerial vehicle. In the RF/OWC hybrid type transmitter, the RF antenna may use a GHz frequency band. In addition, in the RF/OWC hybrid type transmitter, the OWC light source may use a THz band frequency band. Since the RF antenna and the OWC light source are completely independent, frequency interference may not affect each other. In addition, the RF/OWC hybrid type transmitter may be configured in an array form by repeating the elements. In addition, the RF/OWC hybrid type transmitter may include an RF interface and an OWC interface. Accordingly, the RF/OWC hybrid type transmitter may perform communications by selecting one or more among the RF interface and the OWC interface. The antennas and the light sources may transmit duplicated signals, or may perform multi-link transmissions. The AP may allocate the minimum light sources required by the elements for the OWC communication in consideration of a distance and a speed of the aerial vehicle, and the remaining power may be assigned to the RF antennas to serve the same aerial vehicle or different vehicles. Since the aerial vehicle has a battery limitation, a single RF/OWC hybrid type structure may be used. In contrast, the AP may use a multi-RF/OWC hybrid type structure because there is no battery limitation.

Figure 7A:
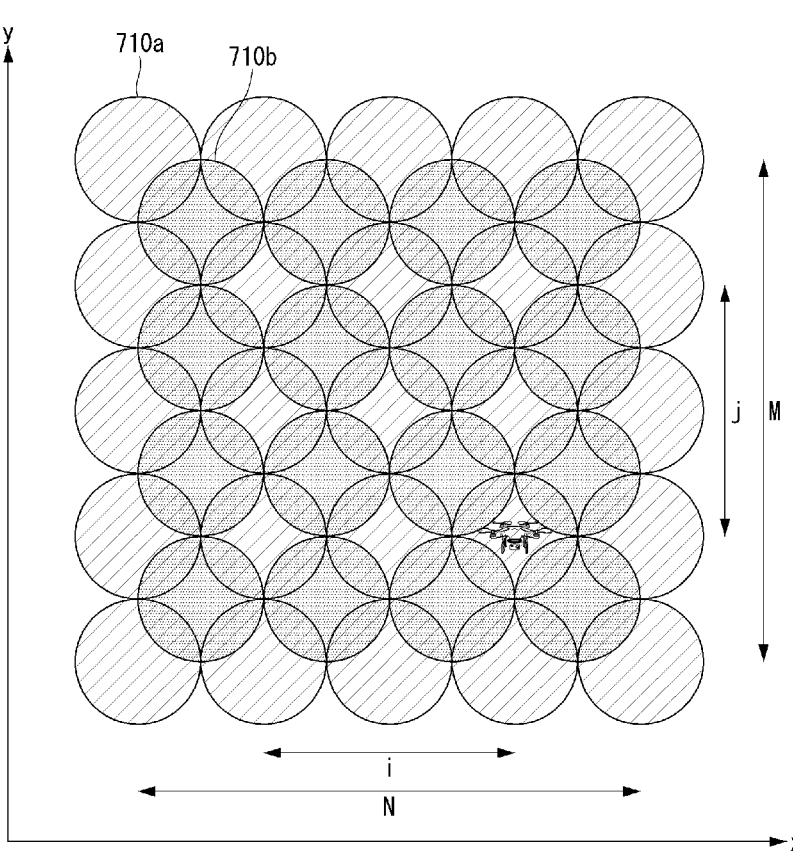
FIGS. 7A to 7C are conceptual diagrams illustrating a first exemplary embodiment of a method for tracking a position of a vehicle using a multi-beam.
Figure 7B:
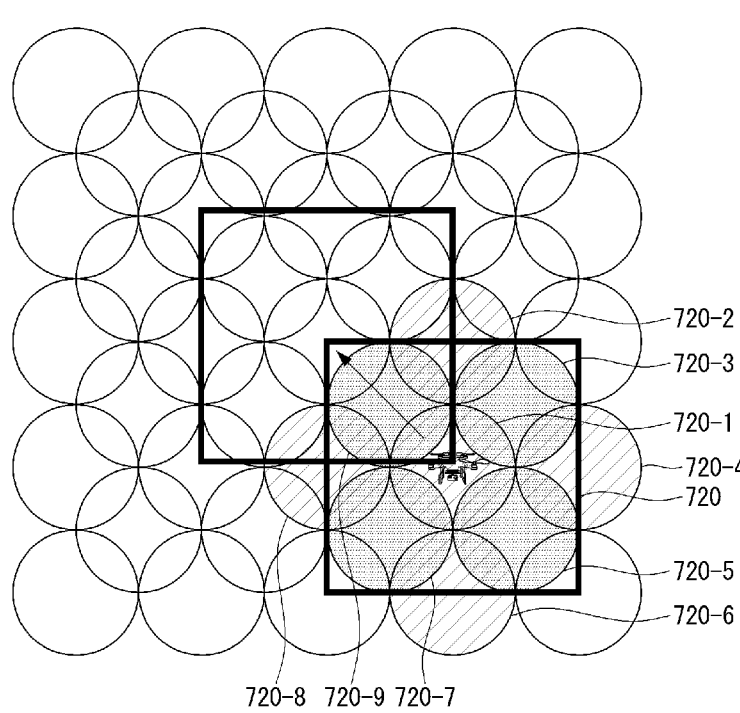
Figure 7C:
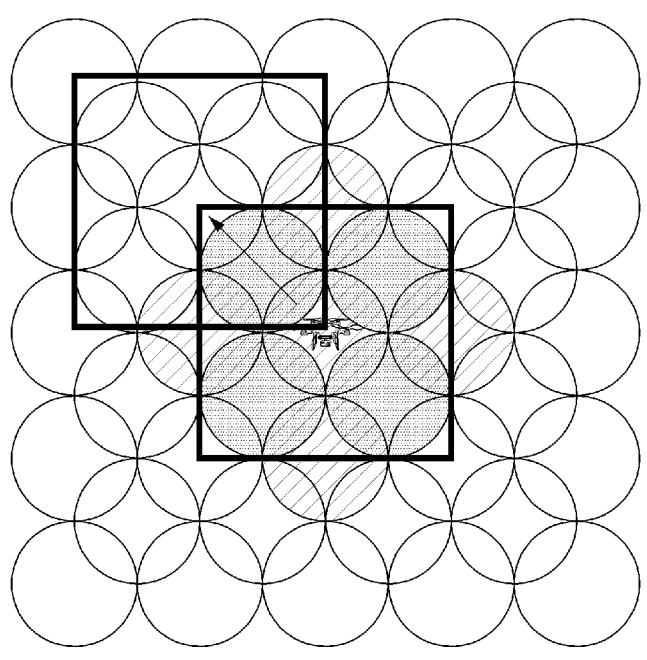

FIGS. 7A to 7C are conceptual diagrams illustrating a first exemplary embodiment of a method for tracking a position of a vehicle using a multi-beam.

Referring to FIG. 7A, in the method of tracking a position of a vehicle using a multi-beam, the AP may forms n transmission beams (i.e., transmission signals) by using all n elements, and transmit the n transmission beams in a direction of an aerial vehicle. Here, the element may be an RF antenna or a light source. In this case, beam widths of the n transmission beams may be the same. As shown in FIG. 7A, the AP may form N beams in the X-axis direction and M beams in the Y-axis direction in an X-axis and Y-axis coordinate system, so that a total of N×M transmissions beams 710a are formed as not being overlapped. Here, the transmission beams thus formed may be referred to as background beams. On the other hand, as shown in FIG. 7A, the AP may form i beams in the X-axis direction and j beams in the Y-axis direction in the X-axis and Y-axis coordinate system so that a total of i×j transmission beams 710b are formed as not being overlapped. In this case, the transmission beam formed by the AP may be located at the center of the four background beams. Accordingly, the transmission beam formed by the AP may partially overlap the four background beams. The transmission beam formed in this manner may be referred to as 'overlap beam'. Here, n may be N×M+i×j. Here, n, N, M, i and j may be natural numbers. In FIG. 7A, N may be 5, M may be 5, i may be 4, j may also be 4, and n may be 41.

In this case, the AP may estimate the approximate direction of the aerial vehicle by using global positioning system (GPS) information received from the aerial vehicle. Alternatively, the AP may estimate the approximate direction of the aerial vehicle by using recent history information of communications with the aerial vehicle. In addition, the AP may assign transmission signal identifiers (or transmission beam identifiers) so that the n transmission beams are distinguishable from each other. In addition, the AP may transmit by including a transmission signal identifier (or a transmission beam identifier) in each of the n transmission beams. Accordingly, the aerial vehicle may receive the transmission beam from the AP. In addition, the aerial vehicle may transmit a response signal for the received transmission beam to the AP. In this case, the response signal may include the transmission signal identifier of the corresponding transmission beam. Accordingly, the AP may receive the response signal, and the AP may extract the transmission beam identifier from the response signal to determine the transmission beam that has reached the aerial vehicle.

Then, referring to FIG. 7B, in the method of tracking a position of a vehicle using a multi-beam, the AP may estimate the movement direction of the aerial vehicle by performing object detection for a predetermined time, and perform an object estimation process for determining k, the number of elements to be used for object tracking. Here, k may be a natural number and may be less than n. The AP may select k elements out of n elements in consideration of a speed and a turbulence of the aerial vehicle. The AP may allocate (n-k) elements to different aerial vehicles. Here, the AP may determine the number of k according to the movement speed, shaking, and channel turbulence of the aerial vehicle. The AP may set a large value of k to maintain a reliable communication link in case of a large movement speed, shaking, and channel turbulence of the aerial vehicle. Alternatively, the AP may set a small value of k to maintain a reliable communication link in case of a small movement speed, shaking, and channel turbulence of the aerial vehicle. In this manner, the AP may configure a signal arrival range of the surrounding elements of the element from which the response signal for the transmission beam has been received as an object tracking range 720 of the aerial vehicle. That is, in FIG. 7B, the AP may configure the transmission beams 720-2 to 720-9 in the vicinity of the transmission beam 720-1 from which the response signal has been received as the object tracking range 720 of the aerial vehicle. Accordingly, k may be 9.

Referring to FIG. 7C, in the method of tracking a position of a vehicle using a multi-beam, the AP may track the position of the aerial vehicle by moving the object tracking range in the movement direction of the aerial vehicle. When the object tracking performance is unstable or the tracking becomes impossible, the AP may return to the object detection step and reset the value of k.

The conventional method may be a method of tracking an aerial vehicle with a single beam. In contrast, the proposed method of tracking an aerial vehicle using a multi-beam may detect the position, direction, and speed of the aerial vehicle by transmitting multiple beams. In addition, the proposed method may be a method of determining the appropriate number of beams, and tracking an aerial vehicle by using the plurality of beams. It may be very difficult for the AP to track an aerial vehicle with a single beam. In case that the AP tracks an aerial vehicle with a single beam, beam tracking performance may deteriorate due to shaking and channel turbulence of the aerial vehicle as well as the movement speed thereof.

Figure 8:
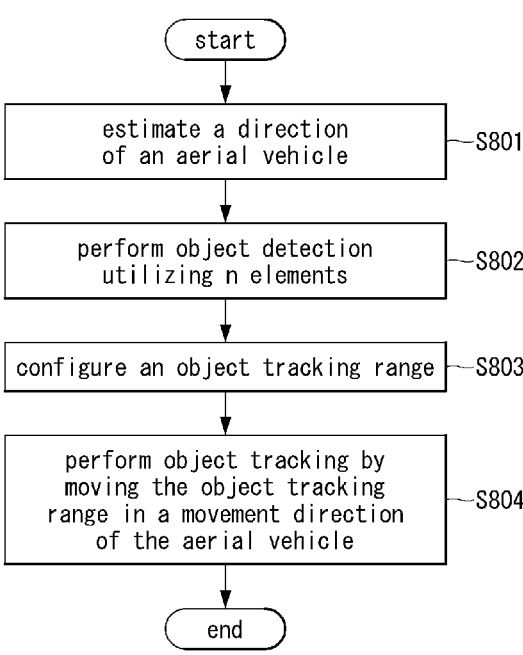
FIG. 8 is a flowchart illustrating a first exemplary embodiment of a method for tracking a position of an aerial vehicle using a multi-beam.

FIG. 8 is a flowchart illustrating a first exemplary embodiment of a method for tracking a position of an aerial vehicle using a multi-beam.

Referring to FIG. 8, in the method of tracking a position of a vehicle using a multi-beam, the AP may estimate a direction of an aerial vehicle (S801). In this case, the AP may estimate an approximate direction of the aerial vehicle using GPS information received from the aerial vehicle. Alternatively, the AP estimate the approximate direction of the aerial vehicle using recent history information of communications with the aerial vehicle. In addition, the AP may perform an object detection procedure in which the AP forms n transmission beams by utilizing all n elements, transmits n transmission beams in the direction of the aerial vehicle, and determine the position of the aerial vehicle by receiving a response signal from the aerial vehicle (S802). In this case, each of the n transmission beams may include a transmission signal identifier that can be distinguished from each other. Accordingly, the aerial vehicle may receive a transmission beam from the AP. In addition, the aerial vehicle may transmit a response signal for the received transmission beam to the AP. In this case, the response signal may include a transmission beam identifier of the corresponding transmission beam. Accordingly, the AP may receive the response signal, and extract the transmission beam identifier from the response signal to determine the transmission beam that has reached the aerial vehicle. Accordingly, the AP may identify the position of the aerial vehicle.

Then, the AP may configure a signal arrival range of surrounding elements of an element for which the response signal for the transmission beam is received as an object tracking range of the aerial vehicle (S803). For example, in the case shown in FIG. 7B, the AP may configure the transmission beams 720-2 to 720-9 in the vicinity of the transmission beam 720-1 for which the response signal is received as the object tracking range 720 of the aerial vehicle. As described above, the AP may determine k, which is the number of elements to use for object tracking. The AP may select k elements out of n elements in consideration of a speed and a turbulence of the aerial vehicle. The AP may allocate the remaining (n-k) elements to different aerial vehicles. Here, the AP may determine the number of k according to the movement speed, shaking, and channel turbulence of the aerial vehicle. The AP may set a large value of k to maintain a reliable communication link in case of a large movement speed, shaking, and/or channel turbulence of the aerial vehicle. Alternatively, the AP may set a small value of k to maintain a reliable communication link in case of a small movement speed, shaking, and/or channel turbulence of the aerial vehicle. Then, the AP may track the aerial vehicle by moving the object tracking range in the movement direction of the aerial vehicle (S804). In this case, when the object tracking performance is unstable or the tracking becomes impossible, the AP may return to the object detection step and reset the value of k.

Figure 9A:
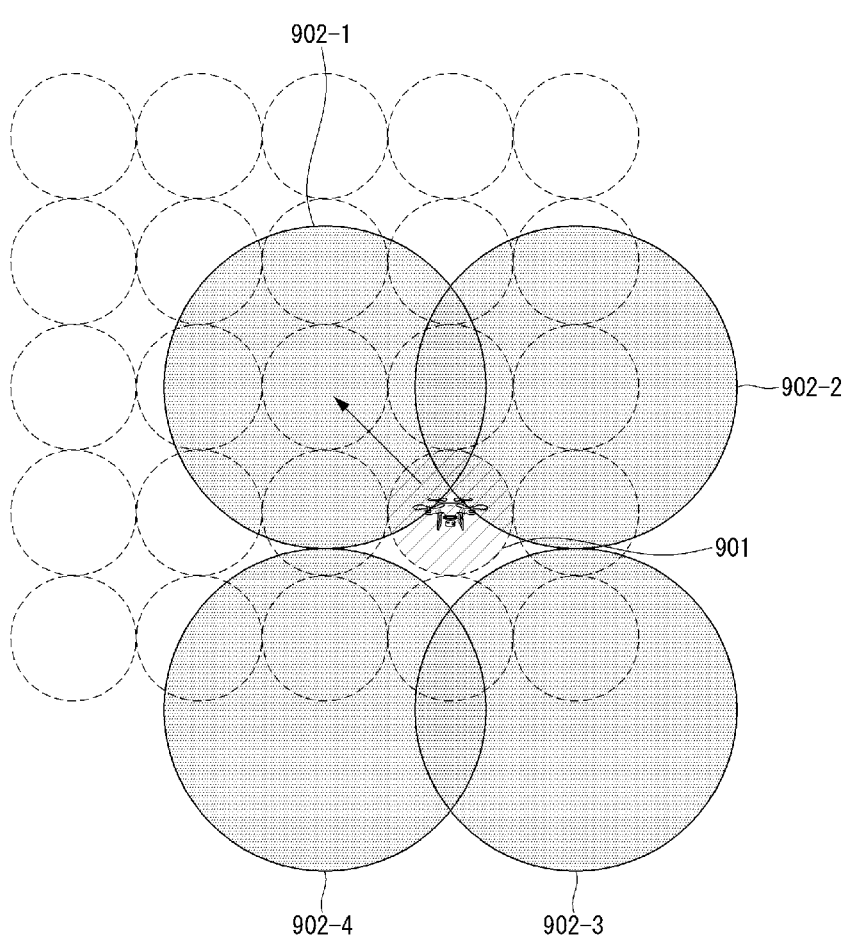
FIGS. 9A and 9B are conceptual diagrams illustrating a first exemplary embodiment of the object tracking process of FIG. 8.
Figure 9B:
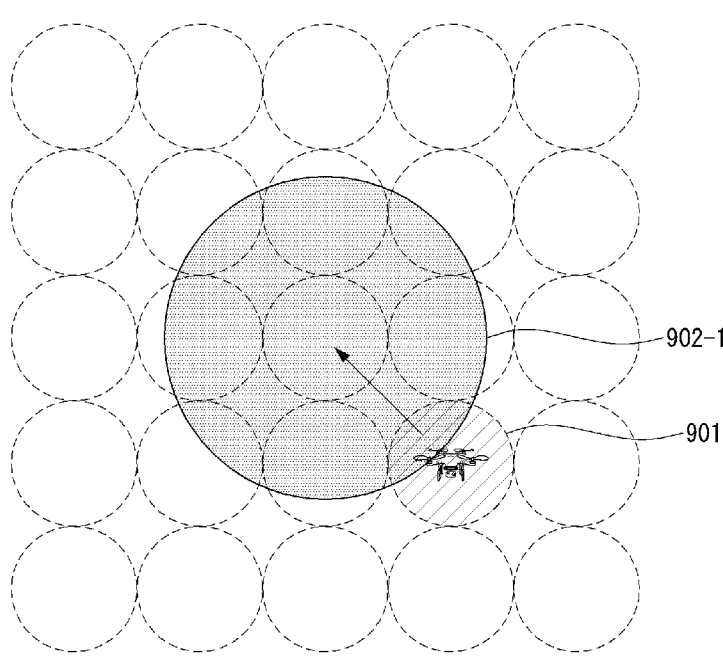

FIGS. 9A and 9B are conceptual diagrams illustrating a first exemplary embodiment of the object tracking process of FIG. 8.

Referring to FIG. 9A, the AP may extend beam widths of overlap beams 902-1 to 902-4 in the vicinity of the transmission beam 901 for which the response signal is received in the object tracking process. In addition, the AP may configure the object tracking range by using the overlap beams 902-1 to 902-4 in the vicinity of the transmission beam 901 with an extended beam width. Then, referring to FIG. 9B, the AP may track the position of the aerial vehicle by limiting the object tracking range to the overlap beam 902-1 in the movement direction of the aerial vehicle.

As described above, when the AP increases the beam widths, the channel quality performance may deteriorate. However, if the AP increases the beam widths, there may be an advantage in that precise tracking of the aerial vehicle is not required. Therefore, the AP may control the beam widths in consideration of required data transmission rate and channel quality. The AP may adjust the beam widths to be larger in case the link performance may be degraded or the link may be disconnected. In contrast, the AP may perform transmissions by reducing the beam widths when the link quality is stable and high-speed data transmission may be required or long-distance transmission is required. In this case, the beam widths for transmitting the current data may be narrow, but the tracking beam widths may be configured to be wide, so that performance robust to movement or channel turbulence of the aerial vehicle may be maintained. As described above, when the AP tracks the aerial vehicle by adjusting the beam widths, the object tracking accuracy, stability and efficiency can be improved.

Figure 10:
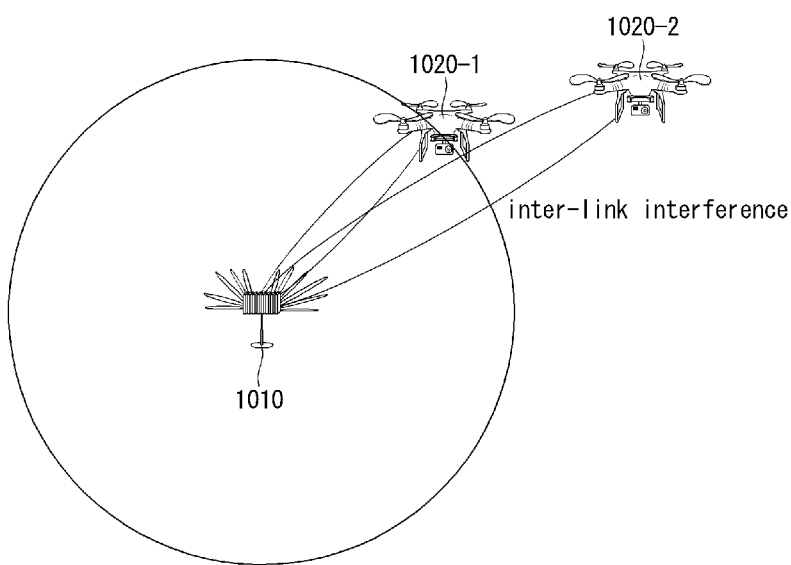
FIG. 10 is a conceptual diagram illustrating a first exemplary embodiment of a communication system showing a link interference situation.

FIG. 10 is a conceptual diagram illustrating a first exemplary embodiment of a communication system showing a link interference situation.

Referring to FIG. 10, an AP 1010 and a first drone 1020-1 may communicate using the OWC scheme. In addition, the AP 1010 and a second drone 1020-2 may also communicate using the OWC scheme. In this case, since the first drone 1020-1 and the second drone 1020-2 may be adjacent to each other, interference between links may occur. Alternatively, since beam widths of the OWC used by the first drone 1020-1 and the second drone 1020-2 are not narrow enough, interference between links may occur.

Figure 11:
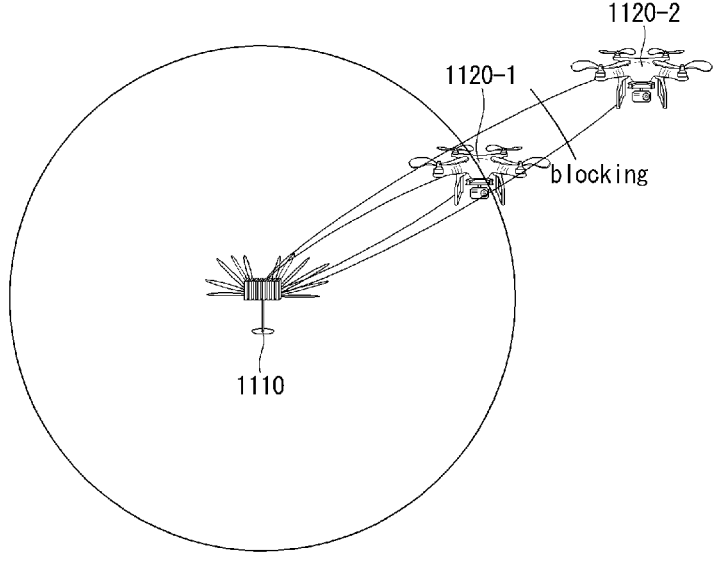
FIG. 11 is a conceptual diagram illustrating a first exemplary embodiment of a communication system indicating a link blocking condition.

FIG. 11 is a conceptual diagram illustrating a first exemplary embodiment of a communication system indicating a link blocking condition.

Referring to FIG. 11, an AP 1110 and a first drone 1120-1 may communicate using the OWC scheme. In addition, the AP 1110 and a second drone 1120-2 may also communicate using the OWC scheme. In this case, the first drone 1120-1 may be located between the AP 1110 and the second drone 1120-2. Accordingly, the first drone 1120-1 may block the link between the AP 1110 and the second drone 1120-2.

Figure 12A:
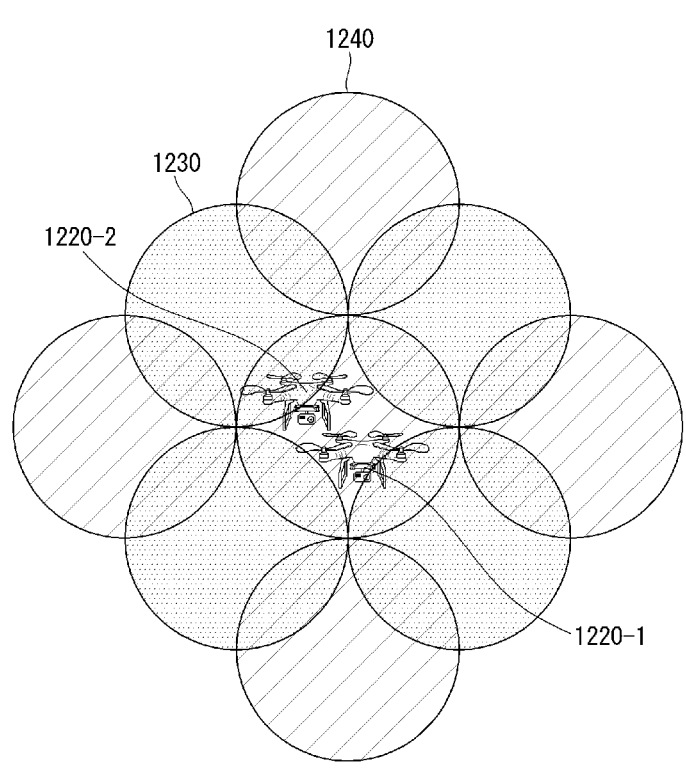
FIGS. 12A to 12C are conceptual diagrams illustrating a first exemplary embodiment of a communication system for avoiding interference in a link interference situation.
Figure 12B:
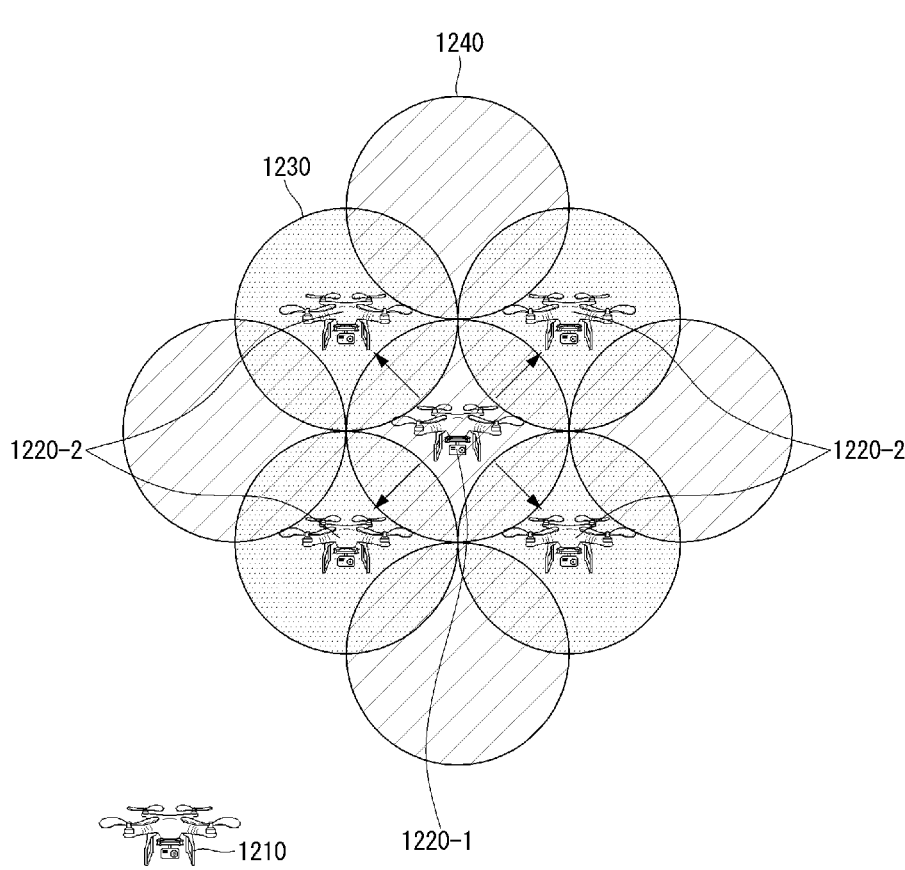
Figure 12C:
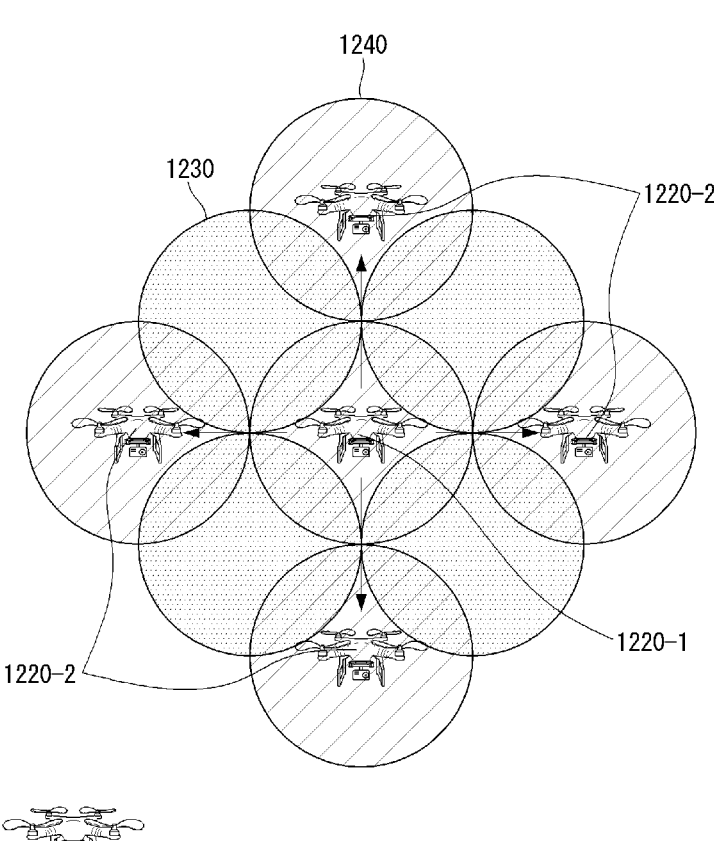

FIGS. 12A to 12C are conceptual diagrams illustrating a first exemplary embodiment of a communication system for avoiding interference in a link interference situation.

Referring to FIG. 12A, an AP 1210 and a first drone 1220-1 may communicate using the OWC scheme. In addition, the AP 1210 and a second drone 1220-2 may also communicate using the OWC scheme. In this case, since the first drone 1220-1 and the second drone 1220-2 may be adjacent to each other, interference between links may occur. Alternatively, since beam widths of the OWC used by the first drone 1220-1 and the second drone 1220-2 are not narrow enough, interference between links may occur.

Referring to FIG. 12B, the first drone 1220-1 may be stationary. On the other hand, the second drone 1220-2 may move to a position of an overlap beam 1230. As such, when the second drone 1220-2 moves to the position of the overlap beam 1230, inter-link interference may still exist. However, the second drone 1220-2 may avoid blocking by the first drone 1220-1. As such, when the second drone 1220-2 moves to the position of the overlap beam 1230, blocking may be avoided. However, even when the second drone 1220-2 moves to the position of the overlap beam 1230, the inter-link interference still exists, and thus performance may be deteriorated due to the inter-link interference.

Referring to FIG. 12C, the first drone 1220-1 may be stationary. On the other hand, the second drone 1220-2 may move to a position of a background beam 1240. In this case, a position of the second drone 1220-2 may be in an object tracking range that does not overlap a position of the first drone 1220-1. As such, when the second drone 1220-2 moves to the object tracking range that does not overlap with a position range of the first drone 1220-1, inter-link interference and blocking may be avoided. The AP 1210 may have a problem of discontinuous tracking when the second drone 1220-2 moves to a region where beams do not overlap in a circle form. In this case, the AP 1210 may use a different communication scheme according to a type of the region. Meanwhile, the AP 1210 may control the movement of the second drone 1220-2. Alternatively, the second drone 1220-2 may move by using an automatic navigation function.

Figure 13:
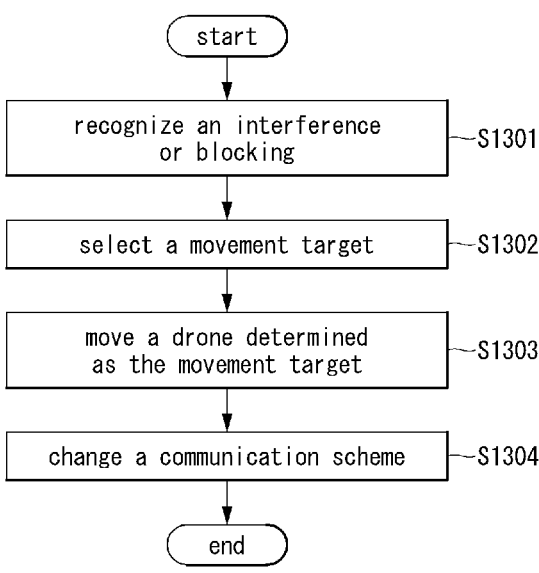
FIG. 13 is a flowchart illustrating a first exemplary embodiment of a communication method for avoiding interference in a link interference situation.

FIG. 13 is a flowchart illustrating a first exemplary embodiment of a communication method for avoiding interference in a link interference situation.

Referring to FIG. 13, the AP may recognize a link interference or link blocking while communicating with the first drone and the second drone (S1301). Then, the AP may select a movement target to be moved among the first drone and the second drone (S1302). In this case, as an example, the AP may select the second drone as the movement target. Thereafter, the AP may move the movement target drone within an object tracking range of a stationary target drone (S1303). As an example, the AP may stop the first drone. Then, the AP may move the second drone to a position of an overlap beam. As described above, even when the second drone moves to the position of the overlap beam, the link interference may still exist.

Alternatively, as another example, the AP may move the second drone to a position of a background beam. As such, when the second drone moves to the position of the background beam, the link interference and blocking may be avoided.

On the other hand, when the AP moves the movement target drone to the position of the overlap beam of the stationary drone, the AP may change the communication scheme (S1304). For example, the AP may perform communications with the stationary drone using the RF scheme, and may perform communications with the moving drone using the OWC scheme.

Meanwhile, a drone using a multi-link of RF communication and OWC may collect data from adjacent drones based on the RF scheme. In addition, the drone may aggregate the data collected from adjacent drones and transmit it to the AP based on the OWC scheme. Since the drone and adjacent drones may communicate using the RF scheme because accurate beam tracking may be difficult due to turbulence and movement of the drones. That is, the data may be transmitted/received between the drone and adjacent drones based on the RF communication scheme. In addition, the drone may aggregate the data collected from the adjacent drones and transmit it to the AP by using the OWC scheme. The drone that aggregates and transmits the data among the drones may be scheduled to move to the AP. Also, the drone that aggregates and transmits the data among the drones may have a large amount of battery available. Also, the drone that aggregates and transmits the data among the drones may have a better radio channel environment than adjacent drones.

Meanwhile, in order for the drone to efficiently transmit the aggregated data, it may be necessary to maintain a stable channel state during the data transmission. Accurate beam steering in the data transmission using the OWC scheme may be difficult due to a turbulence and shaking of the drone. Accordingly, the drone may transmit the data to the AP based on an OWC scheme using a single antenna. In this case, the AP may receive the data transmitted from the drone by using multiple antennas. Accordingly, the drone may transmit the data without accurate direction adjustment, thereby maintaining performance. In this case, the drone may adjust the beam width of the transmission beam to widen the beam width within a limit value for maintaining performance, thereby enabling reliable reception of the AP. As an example of the drone identify an optimal beam width of the transmission beam, the optimal beam width may be determined by measuring a link quality while changing the beam width based on a binary search technique.

Meanwhile, in a wireless network, drones that use multiple interfaces of the RF scheme and the OWC scheme may coexist with drones that do not use multiple interfaces. In addition, there may be drones capable of receiving through an OWC link. Alternatively, there may be drones capable of both transmitting and receiving through an OWC link. The AP may perform a network entry procedure for a drone using only one interface among the RF scheme and the OWC scheme. In addition, the AP may perform a network entry procedure for a drone that can use two interfaces of the RF scheme and the OWC scheme. To this end, the AP may transmit each beacon signal by using each interface. In this case, a drone equipped with the RF interface may attempt to receive the beacon signal through the RF interface. In this case, the drone may fail to receive the beacon signal through the RF interface or to proceed with the subsequent entry procedure. In this case, the drone may receive the beacon signal and perform the network entry procedure by using the OWC interface.

In the network entry procedure, the drone may transmit a network entry request message including information of an interface(s) that it can use to the AP. Accordingly, the AP may receive the network entry request message from the drone. In addition, the AP may identify the information of the interface(s) available to the drones through the network entry request message. In response, the AP may transmit information of supportable interface(s) to the drone. In addition, the AP may negotiate information of interface(s) for actually performing communication for each drone. To this end, the network entry request message may include the following information.

Information on interface(s) of drone:

00: RF communication transmission and reception possible

01: RF communication transmission and reception possible, optical wireless communication transmission and reception possible 02: RF communication transmission and reception possible, optical wireless communication reception possible 03: Optical wireless communication transmission and reception possible Information on interface(s) supported by AP:

00: RF communication transmission and reception possible

01: RF communication transmission and reception possible, optical wireless communication transmission and reception possible 02: RF communication transmission and reception possible, optical wireless communication reception possible 03: Optical wireless communication transmission and reception possible On the other hand, the AP may transmit the beacon signal, which is a type of management frame, to drones within an RF signal coverage to deliver control information such as wake-up information, power-saving information, ID/position information, and/or the like. Alternatively, the AP may deliver the control information such as wake-up information, power-saving information, ID/position information, and/or the like to drones by transmitting a trigger frame, which is a type of control frame to the drones within the RF signal coverage. The wake-up information may be control information for switching circuits such as the communication interface, sensors, and the like of the drone to an active state. In addition, the power-saving information may include information on an ID and a mode of the drone to be controlled. The wake-up information may be a periodic repetition sequence or information included in a signal field. When the AP uses a periodic repetition sequence as the wake-up information, upon receiving the periodic repetition sequence, a wake-up receiver of the drone may generate a control signal that switches specific circuits to an active mode, and transmit the control signal to a control target(s). Even when a request frame or response frame is not used, the circuit(s) turned on by the wake-up information may be turned off after performing the data reception based on the power-saving control information included in the beacon frame.

The AP or the drone may transmit the beacon signal or the trigger frame. Since battery efficiency is very important for drones, basically, the drone may consume the minimum amount of power in a power-saving mode until a reception signal is input. The wake-up information may be information indicating that the circuit(s) in the power-saving mode should be switched to the active mode because data to be transmitted from a side that has transmitted the beacon signal is accumulated in a buffer.

The drones receiving the wake-up information may receive or transmit data by switching the OWC interface from an off state to an on state. The AP may inform each drone whether to maintain the power-saving mode or switch to the active mode by utilizing buffering data information represented as a bitmap of the beacon.

Meanwhile, the ID/position information may be an identifier (ID) of a drone existing in the network and geo-location information. The AP and the drone may use this information to identify the drone, prevent collisions, and perform cooperative communication. The AP and the drone may use the ID and position information of the drone as information for identification of the drone to prevent collisions between adjacent drones and to identify adjacent drones for cooperative communication.

Figure 14A:
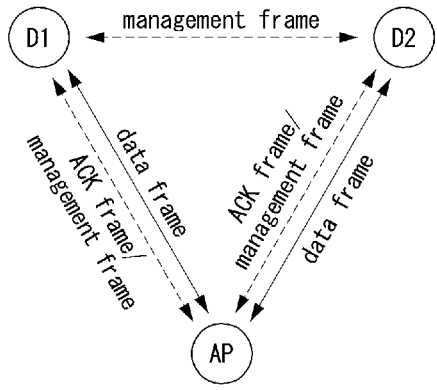
FIGS. 14A and 14B are conceptual diagrams illustrating a first exemplary embodiment of a data transmission method in a communication system.
Figure 14B:
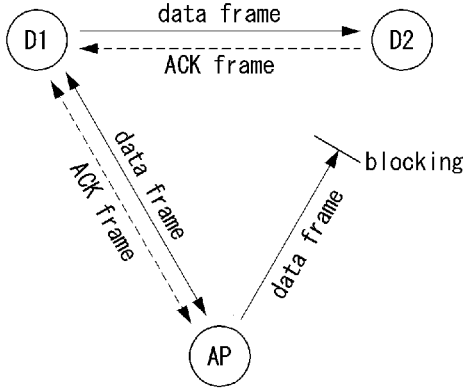

FIGS. 14A and 14B are conceptual diagrams illustrating a first exemplary embodiment of a data transmission method in a communication system.

Referring to FIG. 14A, in the data transmission method, when a drone 1 (D1) communicates with an AP, data frames, management frames (e.g., beacon), and ACK frames may be exchanged. Here, the management frames may include a request frame and a response frame. In addition, the drone 1 may exchange management frames when communicating with a drone 2 (D2). In addition, the drone 2 may exchange data frames, management frames, and ACK frames when communicating with the AP. Here, the request frame may be a management frame or a control frame. Also, the response frame may be a management frame, but may also be a control frame.

In FIG. 14A, a dotted line may mean RF communication, and a solid line may mean optical wireless communication. The drone 1 may transmit/receive a data frame to and from the AP based on the OWC scheme. In addition, the drone 1 may transmit/receive a data frame to and from the drone 2 based on the OWC scheme. In addition, the drone 2 may transmit/receive a data frame to and from the AP based on the OWC scheme. However, the drone 1 may transmit and receive an ACK frame and a management frame to and from the AP based on the RF scheme. In addition, the drone 1 may transmit and receive an ACK frame and a management frame to and from the drone 2 based on the RF scheme. In addition, the drone 2 may transmit and receive an ACK frame and a management frame to and from the AP based on the RF scheme.

Referring to FIG. 14B, in the data transmission method, the AP may transmit a data frame to the drone 1. Then, the drone 1 may receive the data frame from the AP, and the drone 1 may transmit an ACK frame to the AP. Meanwhile, the drone 1 may transmit a data frame to the drone 2, and the drone 2 may receive the data frame the from drone 1. Then, the drone 2 may transmit an ACK frame to the drone 1. Meanwhile, the AP may transmit a data frame to the drone 2. In this case, when a blocking occurs between the AP and the drone 2 by the drone 1, the drone 2 may not receive the data frame from the AP. In FIG. 14B, a dotted line may mean RF communication, and a solid line may mean optical wireless communication.

As can be seen from FIGS. 14A and 14B, the AP and the drones may transmit/receive data requiring a high transmission rate based on the OWC scheme. In addition, the AP and the drones may transmit and receive the ACK frames and the management frames based on the RF scheme. However, as can be seen from FIG. 14b, in the case of the OWC scheme, a very high transmission rate may be achieved, but if a line-of-sight (LOS) condition is not established as shown in the AP and the drone 2, there may be a problem that signal transmission is impossible.

Figure 15:
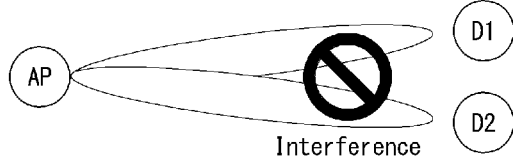
FIG. 15 is a conceptual diagram illustrating a first exemplary embodiment of a two-link environment in which interference exists.

FIG. 15 is a conceptual diagram illustrating a first exemplary embodiment of a two-link environment in which interference exists.

Referring to FIG. 15, when an AP and a drone 1 (D1) are communicating based on the OWC scheme in two-link environments in which interference exists, the AP and a drone 2 (D2) may not communicate based on the OWC scheme due to the interference. The AP and the drone 1 may first communicate based on the OWC scheme, and then the AP and the drone 2 may communicate based on the OWC scheme. Alternatively, the AP and the drone 2 may first communicate based on the OWC scheme first, and then the AP and the drone 1 may communicate based on the OWC scheme.

Meanwhile, the drone 2 may also receive a request message transmitted by the AP to the drone 1. In addition, the drone 2 may recognize that simultaneous transmissions cannot be performed in a transmission period of the AP and the drone 1 according to its interference table. Accordingly, the drone 2 may not attempt data transmission in the transmission period of the drone 1.

Figure 16:
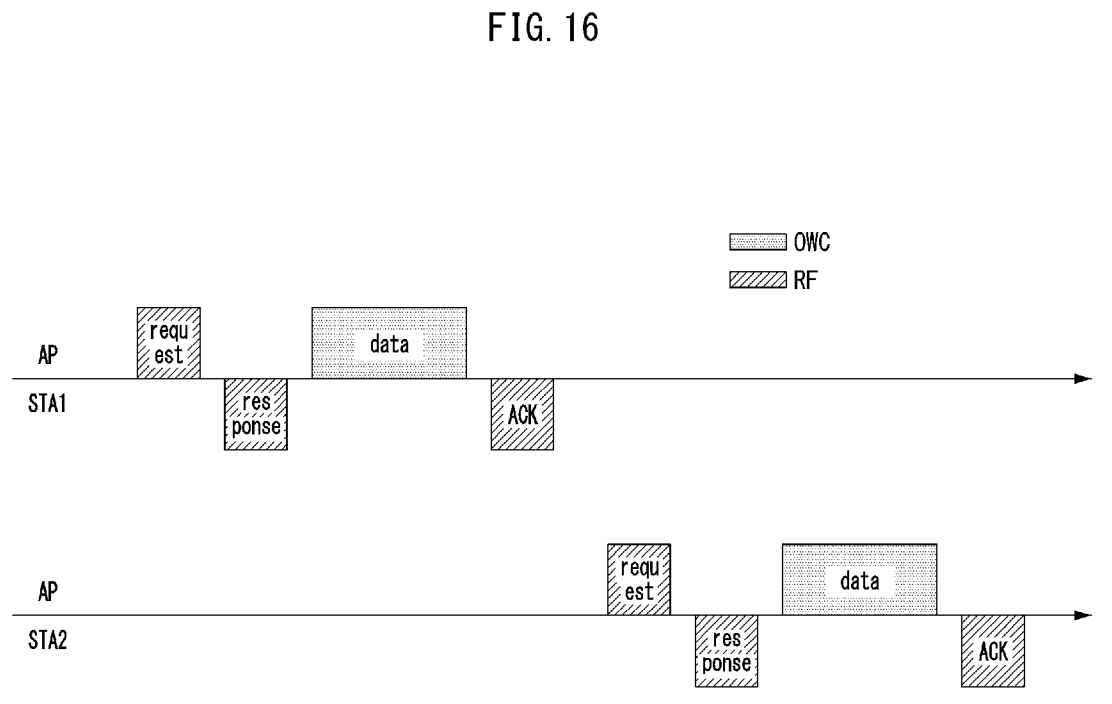

FIG. 16 is a conceptual diagram illustrating a first exemplary embodiment of a data transmission method when a link interference exists.

Referring to FIG. 16, in the data transmission method, an RF channel used by an AP and a STA1 may be the same as an RF channel used by the AP and an STA2. In addition, an OWC channel used by the AP and the STA1 may be the same as an OWC channel used by the AP and the STA2. Accordingly, the STA1 and the STA2 may sequentially transmit frames in a time division multiplexing (TDM) scheme.

In such the situation, when the STA1 and the STA2 communicate with the AP, request frames and response frames may be used to perform transmissions without collision over the two links. That is, the AP may transmit a request frame to the STA1 through the RF channel, and the STA1 may receive the request frame from the AP. In addition, the STA1 may transmit to the AP an ACK frame including a response indicating that data may be transmitted to the AP. Meanwhile, the neighboring STA2 may identify a data transmission time to be used when the AP transmits the data to the STA1 through data transmission period information (i.e., data transmission time information) included in the request frame. Then, the STA2 may not perform transmission during the identified data transmission time. Here, an radio channel may be the RF channel or the OWC channel. If the AP uses the OWC channel when transmitting the data to the STA1, the STA2 may transmit/receive a frame using the RF channel. A channel used for data reception designated by the request frame received by the STA1 from the AP may be the OWC channel. Then, when the OWC interface is in the power-saving mode, the STA1 may change a power of the OWC interface to an ON state.

Looking at this in more detail, the AP may transmit the request frame to the STA1 based on the RF scheme, and the STA1 may receive the request frame from the AP based on the RF scheme. Accordingly, the STA1 may transmit the response frame to the AP based on the RF scheme, and the AP may receive the response frame from the STA1 based on the RF scheme. Accordingly, the AP may transmit the data frame to the STA1 based on the OWC scheme, and the STA1 may receive the data frame from the AP based on the OWC scheme. Accordingly, the STA1 may transmit an ACK frame to the AP based on the RF scheme.

Meanwhile, the STA2 may identify the data transmission time to be used when the AP transmits data to the STA1 through the data transmission period information included in the request frame transmitted by the AP to the STA1. Then, the STA2 may not perform transmission during the identified data transmission time. Accordingly, the AP may receive the ACK frame from the STA1 based on the RF scheme, and thereafter the AP may transmit the request frame to the STA2 based on the RF scheme, and the STA2 may receive the request frame from the AP based on the RF scheme. Accordingly, the STA2 may transmit the response frame to the AP based on the RF scheme, and the AP may receive the response frame from the STA2 based on the RF scheme. Accordingly, the AP may transmit the data frame to the STA2 based on the OWC scheme, and the STA2 may receive the data frame from the AP based on the OWC scheme. Accordingly, the STA2 may transmit an ACK frame to the AP based on the RF communication scheme, and the AP may receive the ACK frame from the STA2 based on the RF communication scheme.

Figure 17:
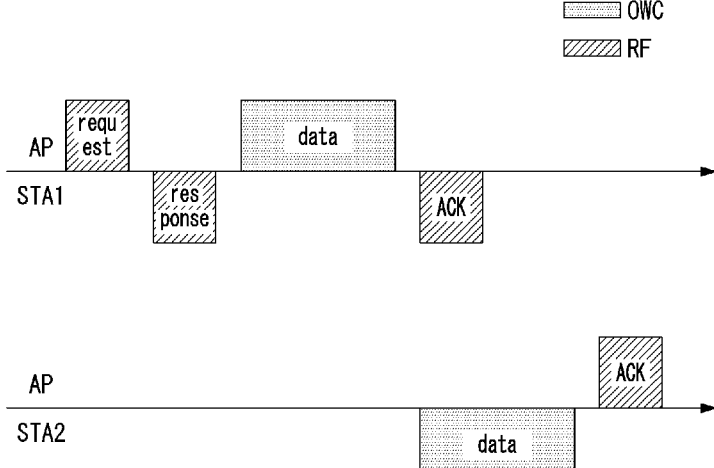
FIG. 17 is a conceptual diagram illustrating a first exemplary embodiment of a data transmission method in consideration of a link guard period.

FIG. 17 is a conceptual diagram illustrating a first exemplary embodiment of a data transmission method in consideration of a link guard period.

Referring to FIG. 17, in the data transmission method, an RF channel used by an AP and a STA1 may be the same as an RF channel used by the AP and an STA2. In addition, an OWC channel used by the AP and the STA1 may be the same as an OWC channel used by the AP and the STA2.

In the above-described situation, the STA2 may recognize an OWC period (i.e., guard period) between the AP and the STA1 based on the communication scheme between the AP and the STA1, and may transmit a data frame to the AP after the guard period of the OWC link.

First, the AP may transmit a request frame to the STA1 based on the RF scheme, and the STA1 may receive the request frame from the AP based on the RF scheme. In this case, the STA2 may also receive the request frame from the AP based on the RF scheme. In this case, the request frame may include data transmission period information (i.e., data transmission time information). Accordingly, the STA2 may recognize the data transmission time of the AP and the STA1. Meanwhile, the STA1 may transmit a response frame to the AP based on the RF scheme, and the AP may receive the response frame from the STA1 based on the RF scheme. In this case, the STA2 may also receive the response frame from the STA1. Accordingly, the STA2 may identify the data transmission period from the request frame transmitted from the AP to the STA1 and the response frame transmitted from the STA1 to the AP. As a result, the STA2 may transmit data after the data transmission period (i.e., channel occupancy period) ends. That is, the AP may transmit the data frame to the STA1 based on the OWC scheme, and the STA1 may receive the data frame from the AP based on the OWC scheme. Accordingly, the STA1 may transmit an ACK frame to the AP based on the RF scheme, and the AP may receive the ACK frame from the STA1 based on the RF scheme. In this case, the STA2 may perform data transmission based on the OWC scheme after the data transmission period (i.e., channel occupancy period) ends. That is, the STA2 may transmit the data frame to the AP based on the OWC scheme after data transmission period (i.e., channel occupancy period), and the AP may receive the data frame from the STA2 based on the OWC scheme. Then, the AP may transmit an ACK frame to the STA2 based on the RF scheme, and the STA2 may receive the ACK frame from the AP based on the RF scheme.

Figure 18:
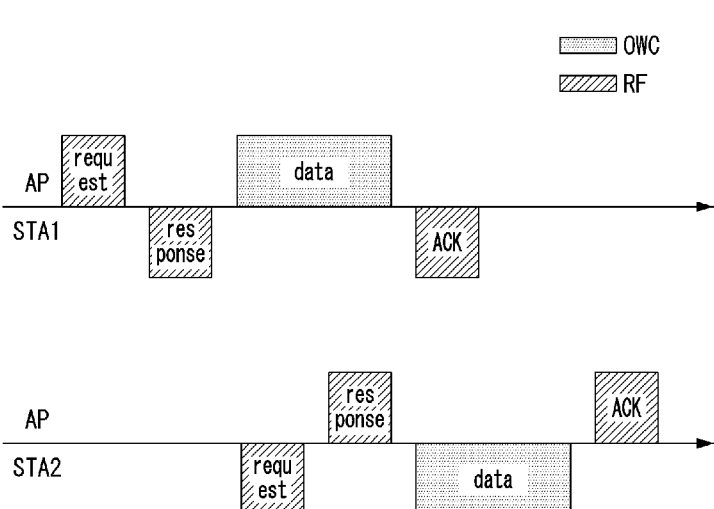
FIG. 18 is a conceptual diagram illustrating a second exemplary embodiment of a data transmission method in consideration of a link guard period.

FIG. 18 is a conceptual diagram illustrating a second exemplary embodiment of a data transmission method in consideration of a link guard period.

Referring to FIG. 18, in the data transmission method, an RF channel used by an AP and a STA1 may be the same as an RF channel used by the AP and an STA2. In addition, an OWC channel used by the AP and the STA1 may be the same as an OWC channel used by the AP and the STA2.

In the above-described situation, the STA2 may recognize an OWC period (i.e., guard period) between the AP and the STA1 based on the communication scheme between the AP and the STA1, and then may transmit a request frame to the AP based on the RF scheme in the guard period of the OWC link. In addition, in the above-described situation, the STA2 may recognize the OWC period (i.e., guard period) between the AP and the STA1 through communication between the AP and the STA1, and then may transmit a data frame to the AP after the guard period of the OWC link.

First, the AP may transmit a request frame to the STA1 based on the RF scheme, and the STA1 may receive the request frame from the AP based on the RF scheme. In this case, the STA2 may also receive the request frame from the AP based on the RF scheme. In this case, the request frame may include data transmission period information (i.e., data transmission time information). Accordingly, the STA2 may recognize the data transmission time of the AP and the STA1. Meanwhile, the STA1 may transmit a response frame to the AP based on the RF scheme, and the AP may receive the response frame from the STA1 based on the RF scheme. In this case, the STA2 may also receive the response frame from the STA1. Accordingly, the STA2 may identify the data transmission period from the request frame transmitted from the AP to the STA1 and the response frame transmitted from the STA1 to the AP.

In the above-described situation, the STA2 may recognize the OWC period (i.e., guard period) between the AP and the STA1 through the communication between the AP and the STA1, and then may transmit a request frame to the AP based on the RF scheme in the guard period of the OWC link, and the AP may receive the request frame from the STA2. Accordingly, the AP may transmit a response frame to the STA2 based on the RF scheme, and the STA2 may receive the response frame from the AP based on the RF scheme. As a result, the STA2 may transmit data after the data transmission period (i.e., channel occupancy period) ends. That is, the AP may transmit the data frame to the STA1 based on the OWC scheme, and the STA1 may receive the data frame from the AP based on the OWC scheme. Accordingly, the STA1 may transmit an ACK frame to the AP based on the RF scheme, and the AP may receive the ACK frame from the STA1 based on the RF scheme. In this case, the STA2 may perform data transmission based on the OWC scheme after the data transmission period (i.e., channel occupancy period) ends. That is, the STA2 may transmit the data frame to the AP based on the OWC scheme after the data transmission period (i.e., channel occupancy period), and the AP may receive the data frame from the STA2 based on the OWC scheme. Then, the AP may transmit an ACK frame to the STA2 based on the RF scheme, and the STA2 may receive the ACK frame from the AP based on the RF scheme.

Figure 19:
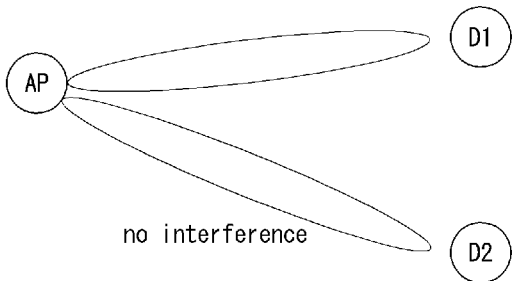
FIG. 19 is a conceptual diagram illustrating a first exemplary embodiment of a two-link environment without interference.

FIG. 19 is a conceptual diagram illustrating a first exemplary embodiment of a two-link environment without interference.

Referring to FIG. 19, in a two link environment without interference, an AP and a drone 1 may be communicating based on the OWC scheme. In this case, a drone 2 may be far away from the drone 1. Accordingly, the AP and the drone 2 may communicate without interference based on the OWC scheme. Accordingly, the drone 2 may also receive a request message transmitted by the AP to the drone 1. In addition, the drone 2 may recognize that simultaneous transmissions can be performed in a transmission period of the AP and the drone 1 according to its interference table, and thus may identify a period in which simultaneous transmissions can be performed. The drone 2 may perform data transmission when there is data to be transmitted to the AP in the period in which simultaneous transmissions can be performed.

Figure 20:
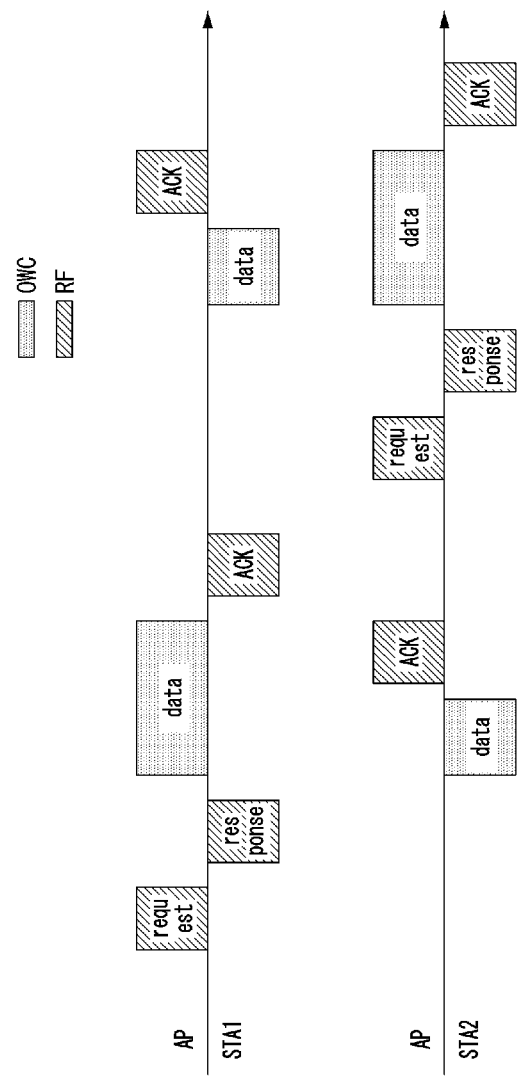
FIG. 20 is a conceptual diagram illustrating a first exemplary embodiment of a data transmission method in a two-link environment without interference.

FIG. 20 is a conceptual diagram illustrating a first exemplary embodiment of a data transmission method in a two-link environment without interference.

Referring to FIG. 20, in the data transmission method, an RF channel used by an AP and a STA1 may be the same as an RF channel used by the AP and an STA2. In addition, an OWC channel used by the AP and the STA1 may be the same as an OWC channel used by the AP and the STA2.

In this case, the STA2 may be far away from the STA1. Accordingly, the AP and the STA2 may communicate based on the OWC scheme without interference. Accordingly, the STA2 may also receive a request message transmitted from the AP to the STA1. In addition, the STA2 may recognize that simultaneous transmissions can be performed in a data transmission period of the AP and STA1 according to its interference table, and thus may identify a period in which simultaneous transmissions can be performed. When there is data to be transmitted to the AP in the period in which simultaneous transmissions can be performed, the STA2 may perform data transmission.

Looking at this in more detail, the AP may transmit a request frame to the STA1 based on the RF scheme, and the STA1 may receive the request frame from the AP based on the RF scheme. In this case, the STA2 may also receive the request frame from the AP based on the RF scheme. In this case, the request frame may include data transmission period information (i.e., data transmission time information). Accordingly, the STA2 may recognize the data transmission time of the AP and the STA1.

Meanwhile, the STA1 may transmit the response frame to the AP based on the RF scheme, and the AP may receive the response frame from the STA1 based on the RF scheme. In this case, the STA2 may also receive the response frame from the STA1. Accordingly, the STA2 may identify the data transmission period from the request frame transmitted from the AP to the STA1 and the response frame transmitted from the STA1 to the AP. As a result, STA2 may perform data transmission in the data transmission period (i.e., channel occupancy period). That is, the AP may transmit a data frame to the STA1 based on the OWC scheme. Accordingly, the STA1 may receive the data frame from the AP based on the OWC scheme. Then, the STA1 may transmit an ACK frame to the AP based on the RF scheme, and the AP may receive the ACK frame from the STA1 based on the RF scheme. In this case, the STA2 may perform data transmission based on the OWC scheme in the data transmission period (i.e., the channel occupancy period). That is, the STA2 may transmit the data frame to the AP based on the OWC scheme in the data transmission period (i.e., channel occupancy period), and the AP may receive the data frame from the STA2 based on the OWC scheme. Then, the AP may transmit an ACK frame to the STA2 based on the RF scheme, and the STA2 may receive the ACK frame from the AP based on the RF scheme.

Meanwhile, the AP may transmit a request frame to the STA2 based on the RF scheme, and the STA2 may receive the request frame from the AP based on the RF scheme. In this case, the STA1 may also receive the request frame from the AP based on the RF scheme. In this case, the request frame may include data transmission period information (i.e., data transmission time information). Accordingly, the STA1 may recognize the data transmission time of the AP and the STA2.

Meanwhile, the STA2 may transmit a response frame to the AP based on the RF scheme, and the AP may receive the response frame from the STA2 based on the RF scheme. In this case, the STA1 may also receive the response frame from the STA2. Accordingly, the STA1 may identify the data transmission period from the request frame transmitted from the AP to the STA2 and the response frame transmitted from the STA2 to the AP. As a result, the STA1 may perform data transmission in the data transmission period (i.e., channel occupancy period). That is, the AP may transmit a data frame to the STA2 based on the OWC scheme, and the STA2 may receive the data frame from the AP based on the OWC scheme. Accordingly, the STA2 may transmit an ACK frame to the AP based on the RF scheme, and the AP may receive the ACK frame from the STA2 based on the RF scheme. In this case, the STA1 may perform data transmission based on the OWC scheme in the data transmission period (i.e., channel occupancy period). That is, the STA1 may transmit the data frame to the AP based on the OWC scheme in the data transmission period (i.e., channel occupancy period), and the AP may receive the data frame from the STA1 based on the OWC scheme. Then, the AP may transmit an ACK frame to the STA1 based on the RF scheme, and the STA1 may receive the ACK frame from the AP based on the RF scheme.

As described above, FIG. 20 may show that uplink/downlink data transmissions are simultaneously performed between the AP-STA1 link the AP-STA2 link. While the AP perform downlink data transmission to the STA1 through the OWC interface, the STA2 may perform uplink data transmission through the OWC interface.

An ACK frame may be transmitted until downlink data transmission of the link between the STA1 and the AP is completed so that a collision does not occur with an ACK frame of the link between the STA1 and the AP. In order to enable such the simultaneous transmissions, a simultaneous transmit receive (STR) terminal having OWC transmitter and receiver capable of performing transmission and reception simultaneously may be used. In addition, the request frame and the response frame may include information indicating that simultaneous transmissions are possible and information indicating a time period during which the simultaneous transmissions can be performed. The time period during which the simultaneous transmissions can be performed may be configured within a data transmission period of a link that started earlier. Also, if the STA2 transmits data through uplink communication while the AP transmits data to the STA1 through downlink communication, a request/response frame may be transmitted to prevent a signal collision with the STA1.

When the OWC interface is in the power-saving mode, a drone that performs uplink transmission using the OWC scheme may change the power of the OWC interface to an ON state to perform data transmission, and may start a beam forming and tracking procedure for the transmission.

Figure 21:
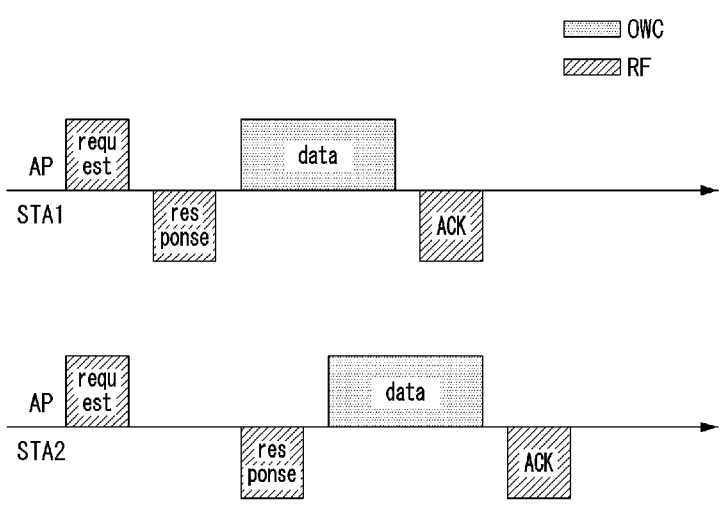
FIG. 21 is a conceptual diagram illustrating a second exemplary embodiment of a data transmission method in a two-link environment without interference.

FIG. 21 is a conceptual diagram illustrating a second exemplary embodiment of a data transmission method in a two-link environment without interference.

Referring to FIG. 21, in the data transmission method, an RF channel used by an AP and a STA1 may be the same as an RF channel used by the AP and an STA2. In addition, an OWC channel used by the AP and the STA1 may be the same as an OWC channel used by the AP and the STA2.

First, the AP may transmit a request frame to the STA1 based on the RF scheme, and the STA1 may receive the request frame from the AP based on the RF scheme. In this case, the AP may transmit the request frame to the STA2 based on the RF scheme, and the STA2 may receive the request frame from the AP based on the RF scheme. In this case, the request frame may include first data transmission period information (i.e., information on a first data transmission period in which the AP transmits data to the STA1) and second data transmission period information (i.e., information on a second data transmission period in which the AP transmits data to the STA2). In addition, the request frame may include information on the communication scheme in which the AP transmits data to the STA1 and information on the communication scheme in which the AP transmits data to STA2. Here, the data transmission period or data transmission time may be a transmission time length.

Accordingly, the STA1 may recognize the second data transmission time in which the AP transmits data to the STA2, and the STA2 may recognize the first data transmission time in which the AP transmits data to the STA1. Of course, the AP may transmit the request frame to the STA1 through the OWC channel, and the STA1 may receive the request frame from the AP based on the OWC scheme. In addition, the AP may transmit the request frame to the STA2 through the OWC channel, and the STA2 may receive the request frame from the AP based on the OWC scheme. Here, the AP may receive information on available communication interfaces from the STA1 and the STA2, and determine the communication schemes to be used for transmission of request frames, data, etc. based on the received information on the communication interfaces.

Meanwhile, the STA1 may transmit a response frame to the AP based on the RF scheme, and the AP may receive the response frame from the STA1 based on the RF scheme in the reception time (or reception time point). In this case, the STA2 may also transmit a response frame to the AP based on the RF scheme. A transmission time of the response frame transmitted by the STA2 to the AP may be different from a transmission time of the response frame transmitted by the STA1 to the AP. Then, the AP may receive the response frame from the STA2 based on the RF scheme in the reception time (or reception time point). Of course, the STA1 may transmit the response frame to the AP based on the OWC scheme, and the AP may receive the response frame from the STA1 based on the OWC scheme. In this case, the STA2 may also transmit the response frame to the AP based on the OWC scheme. In such the situation, the AP may select and use the communication scheme for receiving the response frame from the STA1 or the STA 2 based on the interface of the STA1 or the STA 2 used to transmit the request frame. In addition, the AP may determine a reception time of receiving the response frame from the STA2 based on the communication scheme used for transmitting the request frame and information on the available communication interface of the STA2.

Meanwhile, when the AP transmits the request frame to the STA1 and STA2 in the OWC scheme, the AP may receive the response frame from the STA1 and may receive the response frame from the STA2. In this case, the AP may determine that simultaneous data transmissions to the STA1 and the STA 2 are possible.

Then, the AP may transmit a data frame to the STA1 based on the OWC scheme in the first data transmission time, and the STA1 may receive the data frame from the AP based on the OWC scheme. Accordingly, the STA1 may transmit an ACK frame to the AP based on the RF scheme, and the AP may receive the ACK frame from the STA1 based on the RF scheme. In this case, the AP may transmit a data frame to the STA2 based on the OWC scheme in the second data transmission time, and the STA2 may receive the data frame from the AP based on the OWC scheme. Accordingly, the STA2 may transmit an ACK frame to the AP based on the RF scheme, and the AP may receive the ACK frame from the STA2 based on the RF scheme. Here, the STA1 and the STA2 may sequentially transmit ACK frames to the AP. Accordingly, the AP may sequentially receive the ACK frames from the STA1 and the STA2. Of course, the AP may transmit the data frame to the STA1 based on the RF scheme in the first data transmission time, and the STA1 may receive the data frame from the AP based on the RF scheme. In this case, the AP may transmit the data frame to the STA2 based on the OWC scheme in the second data transmission time, and the STA2 may receive the data frame from the AP based on the OWC scheme. Alternatively, the AP may transmit the data frame to the STA1 based on the OWC scheme in the first data transmission time, and the STA1 may receive the data frame from the AP based on the OWC scheme. In this case, the AP may transmit the data frame to the STA2 based on the RF scheme in the second data transmission time, and the STA2 may receive the data frame from the AP based on the RF scheme. Alternatively, the AP may transmit the data frame to the STA1 based on the RF scheme in the first data transmission time, and the STA1 may receive the data frame from the AP based on the RF scheme. In this case, the AP may transmit the data frame to the STA2 based on the RF scheme in the second data transmission time, and the STA2 may receive the data frame from the AP based on the RF scheme.

Meanwhile, the AP may determine whether simultaneous transmissions to the STA1 and the STA2 are possible by identifying whether the data have been successfully delivered to the STA1 and the STA2 based on the ACK frame received from the STA1 and the ACK frame received from the STA.

Figure 22:
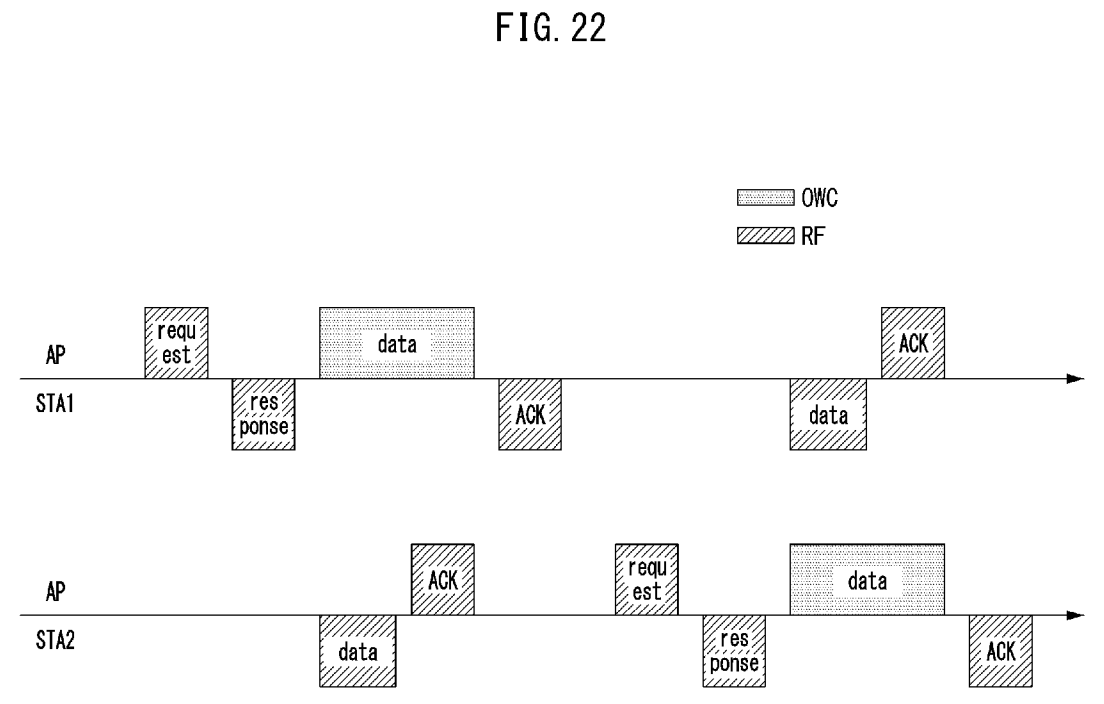

FIG. 22 is a conceptual diagram illustrating a third exemplary embodiment of a data transmission method in a two-link environment without interference.

Referring to FIG. 22, in the data transmission method, an RF channel used by an AP and a STA1 may be the same as an RF channel used by the AP and an STA2. In addition, an OWC channel used by the AP and the STA1 may be the same as an OWC channel used by the AP and the STA2. In this case, when the AP transmits data to the STA1 based on the OWC scheme, the AP may transmit data to the STA2 based on the RF scheme. Also, when the AP transmits data to the STA2 based on the OWC scheme, the AP may transmit data to the STA1 based on the RF scheme.

In the above-described situation, the AP may transmit a request frame to the STA1 based on the RF scheme, and the STA1 may receive the request frame from the AP based on the RF scheme. In this case, the STA2 may also receive the request frame from the AP based on the RF scheme. In this case, the request frame may include first data transmission period information (i.e., information on a first data transmission time). Accordingly, the STA2 may recognize the first data transmission time of the AP and the STA1. In this manner, the STA2 may recognize communication between the AP and the STA1.

Meanwhile, the STA1 may transmit a response frame to the AP based on the RF scheme, and the AP may receive the response frame from the STA1 based on the RF scheme. In this case, the STA2 may also receive the response frame from the STA1. Accordingly, the STA2 may identify the first data transmission time from the request frame transmitted from the AP to the STA1 and the response frame transmitted from the STA1 to the AP. As a result, the STA2 may perform data transmission in the first data transmission time. Looking at this in more detail, the STA2 may transmit a data frame to the AP based on the RF scheme in the first data transmission time, and the AP may receive the data frame from the STA2 based on the RF scheme. In addition, the AP may transmit an ACK frame to the STA2 based on the RF scheme in the first data transmission time, and the STA2 may receive the ACK frame from the AP based on the RF scheme.

Meanwhile, the AP may transmit a request frame to the STA2 based on the RF scheme, and the STA2 may receive the request frame from the AP based on the RF scheme. In this case, the STA1 may also receive the request frame from the AP based on the RF scheme. In this case, the request frame may include second data transmission time information. Accordingly, the STA1 may identify the second data transmission time of the AP and the STA2. In this manner, the STA1 may recognize communication between the AP and the STA1.

Meanwhile, the STA2 may transmit a response frame to the AP based on the RF scheme, and the AP may receive the response frame from the STA2 based on the RF scheme. In this case, the STA1 may also receive the response frame from the STA2. Accordingly, the STA1 may identify the second data transmission time from the request frame transmitted from the AP to the STA2 and the response frame transmitted from the STA2 to the AP. As a result, the STA1 may perform data transmission in the second data transmission time. Looking at this in more detail, the STA1 may transmit a data frame to the AP based on the RF scheme in the second data transmission time, and the AP may receive the data frame from the STA1 based on the RF scheme. In addition, the AP may transmit an ACK frame to STA1 based on the RF scheme in the second data transmission time. The STA1 may receive the ACK frame from the AP based on the RF scheme.

In this manner, while the data frame in transmitted based on the OWC scheme in one link among the link between the AP and the STA1 and the link between the AP and the STA2, data may be transmitted based on the RF scheme also in the other link. In such the situation, even when transmission is performed in one link, the data transmission speed may be improved by simultaneously utilizing the communication interface of the other link. In this case, in order to enable transmissions in this mode, information on a transmission time of data to be transmitted based on the OWC scheme may be transmitted as being included in the request/response frame.

Figure 23:
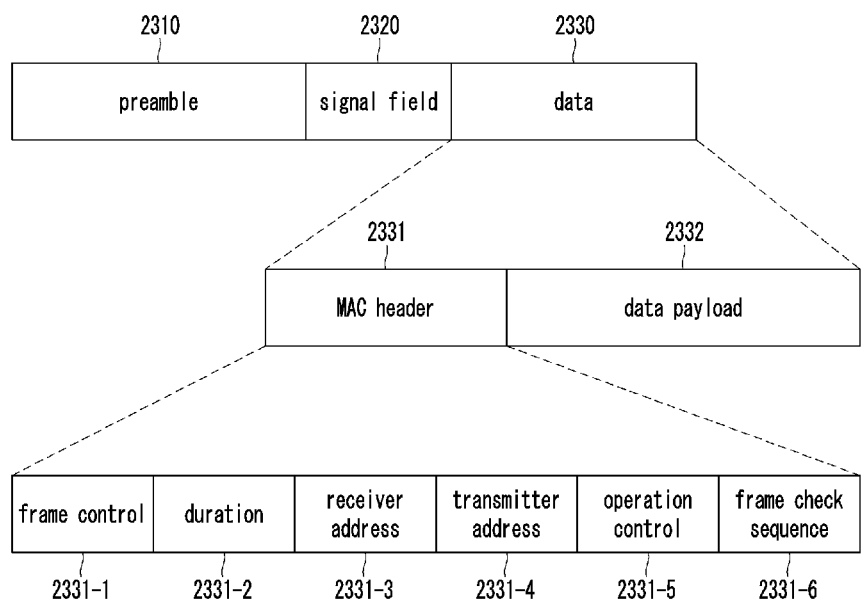
FIG. 23 is a structural diagram illustrating a first exemplary embodiment of a frame structure.

FIG. 23 is a structural diagram illustrating a first exemplary embodiment of a frame structure.

Referring to FIG. 23, a frame structure may include a preamble transmission 2310, a signal field transmission 2320, and a data transmission 2330. In addition, the data transmission 2330 may include a MAC header transmission 2331 and a data payload transmission 2332. In addition, the MAC header transmission 2331 may include a frame control information transmission 2331-1, a duration information transmission 2331-2, a receiver address transmission 2331-3, a transmitter address transmission 2331-4, an operation control information transmission 2331-5, and a frame check sequence transmission 2331-6.

The transmission period of the preamble 2310 may be a period for transmitting a preamble. The preamble may enable a receiving side to sense a reception signal according to a reception power or correlation characteristics. In addition, the preamble may allow the receiving side to control a reception gain according to the reception power or correlation characteristics. In addition, the preamble may be used for frequency offset correction, time offset correction, channel estimation, and synchronization at the receiving side. The transmission period of the signal field 2320 may be a period in which basic information for data restoration, such as a transmission rate and a frame length, is transmitted. In addition, the transmission period of the signal field 2320 may be a period for transmitting a group identifier (ID) when drones are classified into groups.

The transmission period of the frame control information 2331-1 of the transmission period of the data 2330 may be a period for transmitting frame control information. The frame control information may be information indicating a frame type, and may inform control, management, data frame classification and detailed classification (e.g., trigger frame, request frame, response frame). Here, the control frame may include a trigger frame, a request frame, a response frame, and an ACK frame. In addition, the transmission period of the duration 2331-2 may be a period informing of a duration, which is information on a time from when the request frame is received to when a corresponding data frame transmission ends. In addition, the transmission period of the receiver address 2331-3 may be a period informing of a receiver address, which is an address of a receiving side. The transmission period of the transmitter address 2331-4 may be a period informing of a transmitter address, which is an address of a transmitting side. When the type of frame is a request frame, the frame may include both a transmitter address and a receiver address. A drone receiving the request frame may decode the frame if the receiver address matches its own address. When the frame is normally received, the drone may transmit, to a transmitting side, a response frame in which the transmitter address is set to the receiver address.

The transmission period of the operation control information 2331-5 may be a period for transmitting operation control information. The operation control information may mean transmission information including a transmission mode. As shown in Table 1, the operation control information may include multi-link control mode information, information of the number of multi-link simultaneous transmissions to be added, information on addresses of simultaneous transmission terminals to be added, information on a duration for each simultaneous transmission terminal, radio communication interface mode information, wake-up/power-saving bitmap length information, and wake-up/power-saving information.

TABLE 1

| Operation control information | value | Description |
|---|---|---|
| Multi-link control mode information | 0-3 | 0: wake-up<br>1: power-saving<br>2: trigger<br>3: request<br>4: response |
| Number of multi-link simultaneous transmissions to be added | N1-1 | The number of terminals (i.e., drones) to be added for performing simultaneous transmissions |
| Addresses of simultaneous transmission terminals to be added | (N1-1) * 4 bytes | Addresses of terminals to be added for performing simultaneous transmissions |
| Durations for respective simultaneous transmission terminals | (N1-1) * 1 bytes | Duration for each terminal to be added for performing simultaneous transmissions (information on a duration for the first terminal exists in the duration information transmission period) |

TABLE 1-continued

| Operation control information | value | Description |
|---|---|---|
| Radio communication interface mode information | Bitmap (length: 2*N1) | Radio communication interfaces to be used by terminals to be added for performing simultaneous transmissions |
| Wake-up/power-saving bitmap length | L | Wake-up/power-saving bitmap length |
| Wake-up/power-saving information | bitmap | Wake-up/power-saving bitmap |

Here, the multi-link control mode information may be information on the type of frame. Here, the types of frame may include a wake-up frame, a power-saving frame, a trigger frame, a request frame, and a response frame. In this case, for example, a value for the wake-up frame may be 0, a value for the power-saving frame may be 1, a value for the trigger frame may be 2, a value for the request frame may be 3, and a value for the response frame may be 4. The number of multi-link simultaneous transmissions to be added may be the number of terminals (i.e., drones) to be added for multi-link simultaneous transmissions. In this case, the number of simultaneous transmission terminals to be added may be a number obtained by subtracting 1 from the number of terminals performing simultaneous transmissions. For example, when the number of simultaneous multi-link transmissions is N1, the number of simultaneous transmission terminals to be added may be N1-1. The addresses of simultaneous transmission terminals to be added may be a list of addresses of terminals to be added for simultaneous transmissions. In this case, each address may be expressed in 4 bytes. Accordingly, the addresses of simultaneous transmission terminals to be added may be expressed in (N1-1)*4 bytes. As an example, when the AP performs simultaneous transmissions with drones #2 to #4 while communicating with the drone #1, the addresses of simultaneous transmission terminals to be added may include addresses of the drones #2 to #4.

The durations for respective simultaneous transmission terminals may be information on a transmission time used to transmit a frame for each terminal to be added for simultaneous transmissions. In this case, the transmission time may be expressed in 4 bytes. Accordingly, the durations for the respective simultaneous transmission terminals may having a length of (N1-1)*4 bytes. As an example, when the AP performs simultaneous transmissions with the drones #2 to #4 while communicating with the drone #1, the durations of the respective simultaneous transmission terminals may be in form of a list of transmission times for the drones #2 to #4. In addition, the radio communication interface mode information may be information indicating radio communication interfaces to be used by terminals to be added for simultaneous transmissions. For example, the radio communication interface node information may use a bitmap using 2 bits for each added terminal. Accordingly, when the number of simultaneous transmission terminals to be added is N1-1, a bitmap of (N1-1)*4 bytes may be used for the radio communication interface mode information. In this case, if a radio communication interface to be used is the RF communication, corresponding bits may be set to 00, if a radio communication interface to be used is the OWC, corresponding bits may be set to 10, and if both the RF communication and the OWC are to be used, corresponding bits may be set to 11. As an example, the AP may perform simultaneous transmissions with the drones #2 to #4 while performing RF communication with the drone #1. In this case, the AP may use the RF communication for the drone #2, use the OWC for the drone #3, and use the RF communication and the OWC for the drone #4. In this case, the bitmap may be set to 001011.

Meanwhile, the wake-up/power-saving bitmap length may be a length of a bitmap to be used for wake-up/power-saving control. For example, when the number of terminals to be used for wake-up/power-saving control is L, the length of the wake-up/power-saving bitmap may be L. In addition, the wake-up/power-saving bitmap may be a list of bits for the respective terminals to be used for wake-up/power-saving control. For example, if a bit is set to 1, it may mean wake-up, and if a bit is set to 0, it may mean power-saving. Such the operation control information may be included in a beacon frame, a trigger frame, a request frame, and a response frame. In this case, the beacon frame may include a wake-up mode or a power-saving mode as a multi-link control mode.

In addition, the trigger frame may include at least one of the number of simultaneous transmission terminals to be added, addresses of simultaneous transmission terminals to be added, durations for respective simultaneous transmission terminals to be added, and the radio communication interface mode information. In order to perform multi-link transmission using a single OWC interface, the AP may transmit a trigger frame to each link using the OWC interface as shown in FIG. 6. In this case, the AP may include the operation control information in the trigger frame. A terminal (i.e., drone) receiving the trigger frame through the OWC interface may transmit a response frame therefor to the AP through the OWC interface.

If the drone can only receive through the OWC interface, it may transmit a response frame to the AP through the RF interface. When the drone transmits the response frame through the RF interface, the drone may prevent interference with the response frame transmitted through the RF interface by setting a time to transmit the response frame differently according to a link number (i.e., information on an index of the terminal when the number of simultaneous transmissions is 2 or more).

Meanwhile, the request frame for transmitting multi-link transmission information through the RF interface may include the operation control information. In this case, the operation control information included in the request frame may include at least the number of multi-link simultaneous transmissions to be added, addresses of simultaneous transmission terminals to be added, durations for respective simultaneous transmission terminals to be added, and the radio communication interface mode information. When a drone receives the request frame through the RF interface, a response may be transmitted to the AP through the RF interface. In this case, when the drone transmits the response frame through the RF interface, the drone may prevent interference with the response frame transmitted through the RF interface by setting a time to transmit the response frame differently according to a link number (i.e., information on an index of the terminal when the number of simultaneous transmissions is 2 or more).

On the other hand, when the number of multi-link simultaneous transmissions to be added is 0, the AP may perform transmission using only a single link. On the other hand, when the number of multi-link simultaneous transmissions to be added is 1, the AP may perform simultaneous transmissions through two links. For example, in the case of FIG. 21, when the AP performs simultaneous transmissions of two links by using the request frame, the number of simultaneous transmission links may be set to two. Of course, the number of multi-link simultaneous transmissions to be added may be 1. In addition, the radio communication interface used in each link may be different from each other. Such information may include information on a radio interface through which transmission of each link is performed in form a bitmap. The length of this information may be determined by a product of the length of the radio interface mode information bits for the links and the number of multi-link simultaneous transmissions.

The length of the bitmap for representing interface information for each link may be determined as 2 bits when using the RF scheme and the OWC scheme. In this case, when the number of interfaces increases, the number of bits of the interface information for each link may increase. For example, when there are two RF interfaces and one OWC interface, the number of bits of interface information for each link may be 3 bits. Here, the RF scheme and the OWC scheme may each assume one interface, and bits may be assumed to be two bits.

Meanwhile, when there are two or more (N) receiving terminals, the receiver address of the MAC header may include an address of a receiving terminal of the first transmission link. In addition, the addresses of the second to N-th receiving terminals may be included in the addresses of the simultaneous transmission terminals to be added. In addition, the durations including the data transmission times of the second to the N-th links may be included in the durations for the respective simultaneous transmission terminals. When the number of multi-link simultaneous transmissions to be added is 0, the length of the bitmap of the radio communication interface modes may be set to 1. In this case, the AP may use only a single link, and the address of the receiving terminal of the single link used may correspond to the receiver address of the MAC header. An adjacent terminal receiving a request frame may identify link(s) for transmission and reception in the corresponding period and transmission time information of the link(s) through the number of multi-link simultaneous transmissions to be added and the receiver addresses of the respective links. Using this information, the adjacent terminal may perform opportunistic transmissions as shown in FIG. 21.

Meanwhile, the ground control system may perform group-specific communication and control by assigning group-specific IDs to drones for low-power operations in a dense network environment performing group flight and missions.

Figure 24:
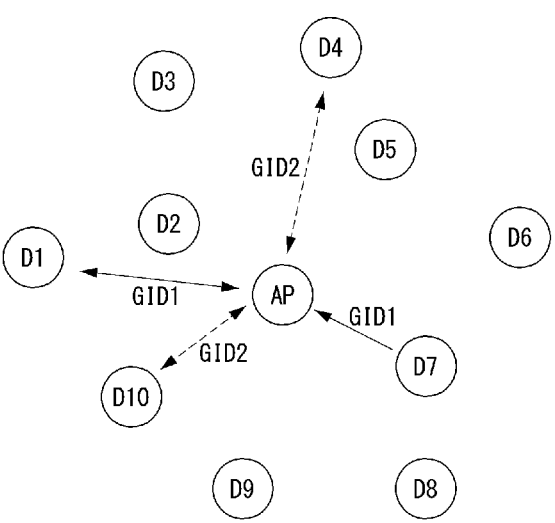
FIG. 24 is a conceptual diagram illustrating a first exemplary embodiment of a low-power control method using group IDs.

FIG. 24 is a conceptual diagram illustrating a first exemplary embodiment of a low-power control method using group IDs.

Referring to FIG. 24, in a low-power control method using group IDs, a ground control system may assign a group identifier 1 (GID1) to a drone 1 (D1) and a drone 7 (D7) as a group ID therefor among the drone 1 to drone 10 (D10). In addition, the ground control system may assign a GID2 to a drone 4 and the drone 10 as a group ID therefor. Other drones are not subject to communication and control, so sensor circuits and OWC interfaces thereof may be in the low-power mode. The group ID may be included in the signal field of the frame structure. Accordingly, each of the drones 1 to 10 may identify whether there is a group ID assigned to itself in the signal field when receiving the frame. Each of the drones 1 to 10 may not process signals anymore and may switch to the low-power mode if there is no group ID assigned to itself. A management/control frame transmitted through an RF channel may include a wake-up/ power-saving bitmap in the operation control information to perform control on terminals within a group.

Figure 25:
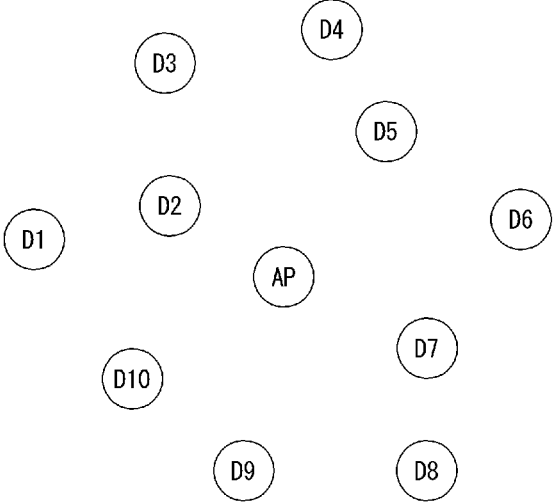
FIG. 25 is a conceptual diagram illustrating a first exemplary embodiment of a low-power control method using a bitmap.

FIG. 25 is a conceptual diagram illustrating a first exemplary embodiment of a low-power control method using a bitmap.

Referring to FIG. 25, in a low-power control method using a bitmap, the ground control system may generate a beacon signal and transmit it to the drones 1 (D1) to 10 (D10). In this case, the beacon signal may include a wake-up mode and a power-saving mode as a multilink control mode. In addition, the beacon signal may include the wake-up/power-saving bitmap length information, and the length of the wake-up/power-saving bitmap may be, for example, 10. Also, the beacon signal may include the wake-up/power-saving bitmap. In this case, if each bit of the bitmap is 1, it may indicate the active mode, and if each bit of the bitmap is 0, it may indicate the power-saving mode. Accordingly, the bitmap may be 1101101001 in order to operate the drones 3, 6, 8, and 9 in the power-saving mode and the others to operate in the active mode. The order of bits within the bitmap may be an order of drone indexes.

Figure 26:
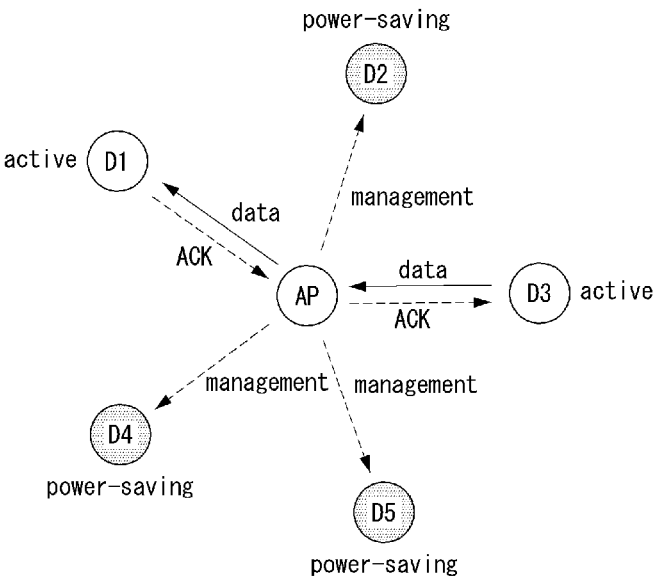
FIG. 26 is a conceptual diagram illustrating a first exemplary embodiment of a communication system operating in a power-saving mode.

FIG. 26 is a conceptual diagram illustrating a first exemplary embodiment of a communication system operating in the power-saving mode.

Referring to FIG. 26, in the communication system operating in the power-saving mode, the drones 1 and 3 may operate in the active mode. In addition, the remaining drones may operate in the power-saving mode. The drone operating in the power-saving mode may put its OWC interface, sensing chip(s) or circuits into the sleep mode, and wait for a wake-up signal.

Figure 27:
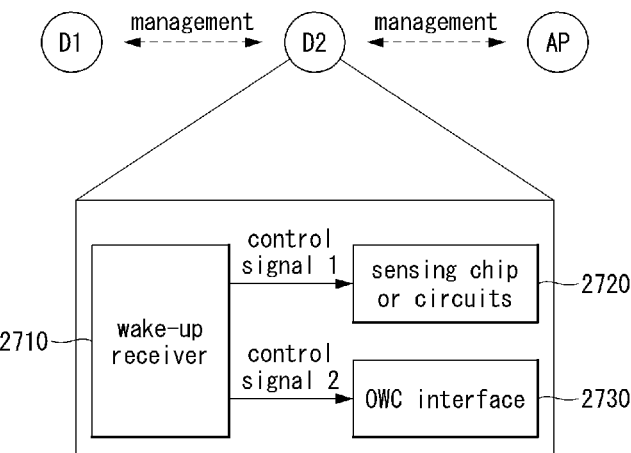
FIG. 27 is a conceptual diagram illustrating a first exemplary embodiment of a method for switching from the power-saving mode to the active mode.

FIG. 27 is a conceptual diagram illustrating a first exemplary embodiment of a method for switching from the power-saving mode to the active mode.

Referring to FIG. 27, in a method of switching from the power-saving mode to the active mode, the drone 2 in the power-saving mode may receive a management frame including a wake-up signal from the AP or the drone 1. Then, a wake-up receiver 2710 of the drone 2 may wake up and activate sensing chip(s) or circuits by using a control signal 1 according to the received wake-up signal. In addition, the wake-up receiver 2710 of the drone 2 may wake up and activate the OWC interface by using a control signal 2 according to the received wake-up signal. As such, the AP or the drone 1 may transmit wake-up information to the drone 2 by using the management frame. Here, the sensing chip may be a low-speed camera optical camera communication (OCC) sensor, radar, or lidar that can be utilized for communication.

Figure 28:
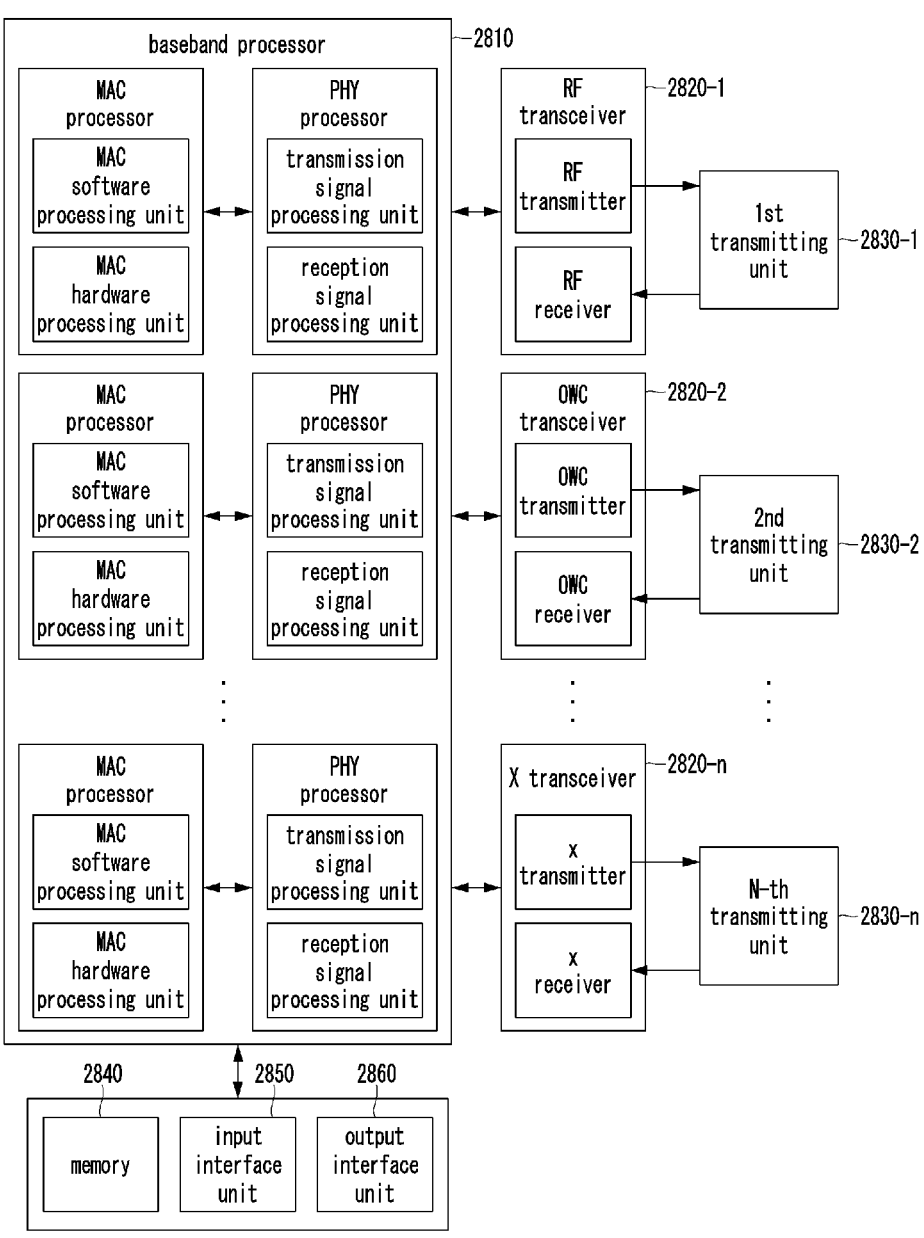
FIG. 28 is a block diagram illustrating a second exemplary embodiment of a communication node constituting a communication system.

FIG. 28 is a block diagram illustrating a second exemplary embodiment of a communication node constituting a communication system.

Referring to FIG. 28, a communication node constituting a communication system may include a baseband processor 2810, a plurality of transceivers 2820-1 to 2820-_n_, a plurality of transmitting units 2830-1 to 2830-_n_, a memory 2840, an input interface unit 2850, and an output interface unit 2860. Here, the plurality of transceivers 2820-1 to 2820-_n_ may include an RF transceiver 2820-1 comprising an RF transmitter and an RF receiver, and an optical wireless transceiver 2820 comprising an optical wireless transmitter and an optical wireless receiver.

In addition, the baseband processor 2810 may perform baseband-related signal processing and may include a MAC processor and a PHY processor. Here, the MAC processor may include a MAC software processing unit and a MAC hardware processing unit. In this case, the memory 2840 may include software including some functions of the MAC layer. The MAC software processing unit may implement some functions of the MAC by driving MAC software. In addition, the MAC hardware processing unit may implement the remaining functions of the MAC layer as hardware, but may not be limited thereto. The PHY processor may include a transmission signal processing unit and a reception signal processing unit. The baseband processor 2810, the memory 2840, the input interface unit 2850, and the output interface unit 2860 may communicate with each other via a bus. The memory 2840 may store an operating system, applications, and the like in addition to the MAC software. The input interface unit 2850 may obtain information from a user. The output interface unit 2860 may output information to the user. The transmitting units 2830-1 to 2830-_n_ may include one or more antennas or light sources for each transceiver.

On the other hand, the ground control system may use an anti-drone technique in real time by transmitting an ID and authentication information that can identify a drone in a frame header. In this case, it may be necessary that the ID and authentication information cannot be forged. The ground control system may generate the ID using a time-synchronized time stamp and a unique fingerprint (e.g., physical unclonable function, PUF) and update it at regular intervals to prevent forgery and replay attack. In this case, the ground control system may have identification target PUF data. The ground control system may use a PUF table (i.e., binary file) of drones while storing and managing the PUF table. The ground control system may obtain this information when registering the drones.

The drone may add a PUF circuit to a built-in communication chip. Then, the drone may use the PUF circuit to generate a non-replicable ID that acts as a hardware fingerprint. Since the PUF has different characteristics for each chip even if the same design circuit, layout and process are used, it may have an excellent effect in preventing forgery and tampering. The drones may threaten life and safety, and there is a risk of information leakage using spoofing or man-in-the-middle attacks, it may be very important to detect unauthorized drones with unforgeable ID authentication.

Figure 29:
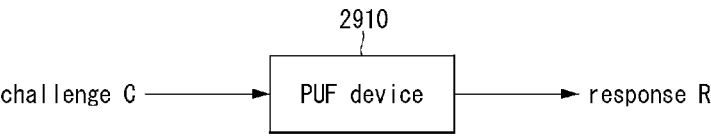
FIG. 29 is a conceptual diagram illustrating a first exemplary embodiment of a physical unclonable function (PUF) device.

FIG. 29 is a conceptual diagram illustrating a first exemplary embodiment of a physical unclonable function (PUF) device.

Referring to FIG. 29, a PUF device 2910 may receive a challenge C and generate a response R. In this case, if the PUF device use a different chip, a response to the same challenge C may be different. The PUF device may be used to prevent forgery or generate a secret key. Therefore, the PUF device may be used for drone registration and identification purposes. In a PUF-based authentication scheme, the ground control system may register PUF values of drones in advance through an authentication server. The PUF may be in form of a table in which challenge (input) values and response (output) values therefor are mapped one-to-one. Since each drone has unique PUF input/output conditions, it may be possible to register and identify drones through the ground control system.

Figure 30:
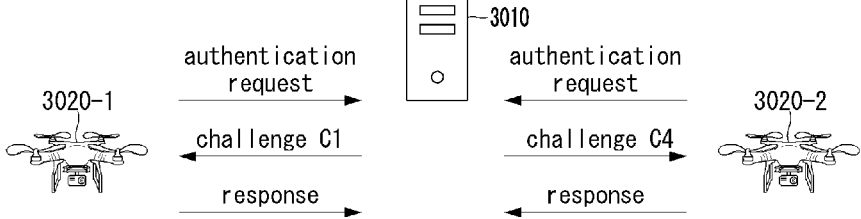
FIG. 30 is a conceptual diagram illustrating a first exemplary embodiment of an authentication method using a PUF device.

FIG. 30 is a conceptual diagram illustrating a first exemplary embodiment of an authentication method using a PUF device.

Referring to FIG. 30, in an authentication method using a PUF device, the ground control system 3010 may store and manage a drone ID, a challenge value, and a response value therefor with respect to the drone 1 3020-1 in a registration step. In this case, the challenge value of the drone 1 may be C1, and the response value therefor may be R1. Also, the ground control system 3010 may store and manage a drone ID, a challenge value, and a response value therefor with respect to the drone 2 3020-2 in a registration step. In this case, the challenge value of the drone 2 may be C4, and the response value therefor may be R4.

Thereafter, the drone 1 3020-1 may transmit an authentication request message including the drone ID to the ground control system, and the ground control system may receive the authentication request message including the drone ID from the drone 1. Accordingly, the ground control system may identify the drone ID of the drone 1 and may identify know the challenge value C1 of the drone 1 from the stored PUF table. Thereafter, the ground control system may transmit the challenge value C1 to the drone 1. The drone 1 may receive the challenge value C1 and may generate a response value R1 through its PUF circuit, and the drone 1 may transmit the generated response value R1 to the ground control system. The ground control system may receive the response value R1 from drone 1. In addition, the ground control system may confirm that the received response value R1 matches the response R1 value stored for the drone 1 through the PUF table, and confirm that the drone 1 is a normal drone.

Similarly, the drone 2 3020-2 may transmit an authentication request message including the drone ID to the ground control system, and the ground control system may receive the authentication request message including the drone ID from the drone 2. Accordingly, the ground control system may identify the drone ID of the drone 2 and may identify know the challenge value C4 of the drone 2 from the stored PUF table. Thereafter, the ground control system may transmit the challenge value C4 to the drone 2. The drone 2 may receive the challenge value C4 and may generate a response value R4 through its PUF circuit, and the drone 2 may transmit the generated response value R4 to the ground control system. The ground control system may receive the response value R4 from drone 2. In addition, the ground control system may confirm that the received response value R4 matches the response R4 value stored for the drone 2 through the PUF table, and confirm that the drone 2 is a normal drone.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method performed by an access point in a communication system, the operation method comprising:
    transmitting, to a first station and a second station, a first frame by using a third communication scheme, the first frame including information on an address of the first station, a first time to transmit first data from the access point to the first station, a first communication scheme to be used for transmitting the first data to the first station, information on a second time to transmit second data from the access point to the first station and a second communication scheme to be used for transmitting second data to the second stations;
    receiving, from the first station, a first response frame for the first frame from the first station at a first reception time; and
    receiving, from the second station, a second response frame for the first frame at a second reception time,
    wherein the first communication scheme is a directional communication scheme or an omni-directional communication scheme, the second communication scheme is the directional communication scheme or the omnidirectional communication scheme and the third communication scheme is the directional communication scheme or the omni-directional communication scheme, and when the first communication scheme and the second communication scheme are identical and simultaneous transmissions to the first station and the second station are impossible, the second time is configured to be immediately after an end of transmission of the first data.

2. The operation method according to claim 1, wherein a communication scheme for receiving the first response frame and the second response frame is determined based on transmittable interfaces of the first station and the second station.

3. The operation method according to claim 1, wherein the second reception time is determined based on the third communication scheme used for transmitting the first frame, and information on a transmittable communication interface of the second station.

4. The operation method according to claim 1, further comprising, when the first communication scheme, the second communication scheme, and the third communication scheme are directional communication schemes, determining whether simultaneous transmissions to the first station and the second station are possible based on whether the first response frame and the second response frame are received.

5. The operation method according to claim 1, wherein the first communication scheme and the second communication scheme are different from each other.

6. The operation method according to claim 1, wherein the first communication scheme and the second communication scheme are identical, and are capable of performing simultaneous transmissions without interfering with each other for data transmission.

7. The operation method according to claim 1, further comprising, when the first communication scheme and the second communication scheme are identical,
    transmitting the first data to the first station;
    receiving a third response frame for the first data from the first station;
    transmitting the second data to the second station;
    receiving a fourth response frame for the second data from the second station; and
    determining whether simultaneous transmissions to the first station and the second station are possible by identifying whether the first data and the second data have been normally transmitted based on the third response frame and the fourth response frame.

8. The operation method according to claim 1, wherein information on communicable interfaces of the first station and the second station is received from the first station and the second station before a simultaneous transmission time, and the first communication scheme and the second communication scheme are determined based on the information on communicable interfaces of the first station and the second station.

9. An operation method performed by a station in a communication system, the operation method comprising:

receiving, from an access point, a first frame by using a first communication scheme;

measuring a reception quality of the first frame;

identifying whether the station is included in destination terminal(s) of the first frame;

when the station is included in the destination terminal(s), identifying a first time to transmit first data from the access point to the station and a second communication scheme to be used for transmitting the first data; and transmitting a response frame for the first frame including the reception quality by using a third communication scheme at a first transmission time, wherein the first frame includes at least one of a number of multi-link simultaneous transmissions to be added, addresses of simultaneous transmission terminals to be added, or durations for respective simultaneous transmission terminals for multi-link simultaneous transmission, the first communication scheme is a directional communication scheme or an omni-directional communication scheme, the second communication scheme is the directional communication scheme or the omni-directional communication scheme and the third communication scheme is the directional communication scheme or the omni-directional communication scheme, and when the first communication scheme is the directional communication scheme using an optical wireless communication (OWC) technology and the station is capable of performing transmission using the directional communication scheme, the third communication scheme is determined as the directional communication scheme using the OWC technology, and in other cases, the third communication scheme is determined as the omni-directional communication scheme.

10. The operation method according to claim 9, wherein the first frame includes a receiver address transmission and an operation control information transmission, and when the receiver address transmission includes an address of the station, a first responsive time is determined as the first transmission time, or when the operation control information transmission includes the address of the station, the first transmission time is sequentially determined from the first responsive time.

\* \* \* \* \*